Nov. 29, 1966 W. W. MOE 3,288,925
APPARATUS FOR PREPARING COLOR SEPARATION NEGATIVES
Filed Nov. 28, 1962 15 Sheets-Sheet 1

INVENTOR.
WILLIAM WEST MOE
BY
Brumbaugh, Free, Graves & Donohue
his ATTORNEYS

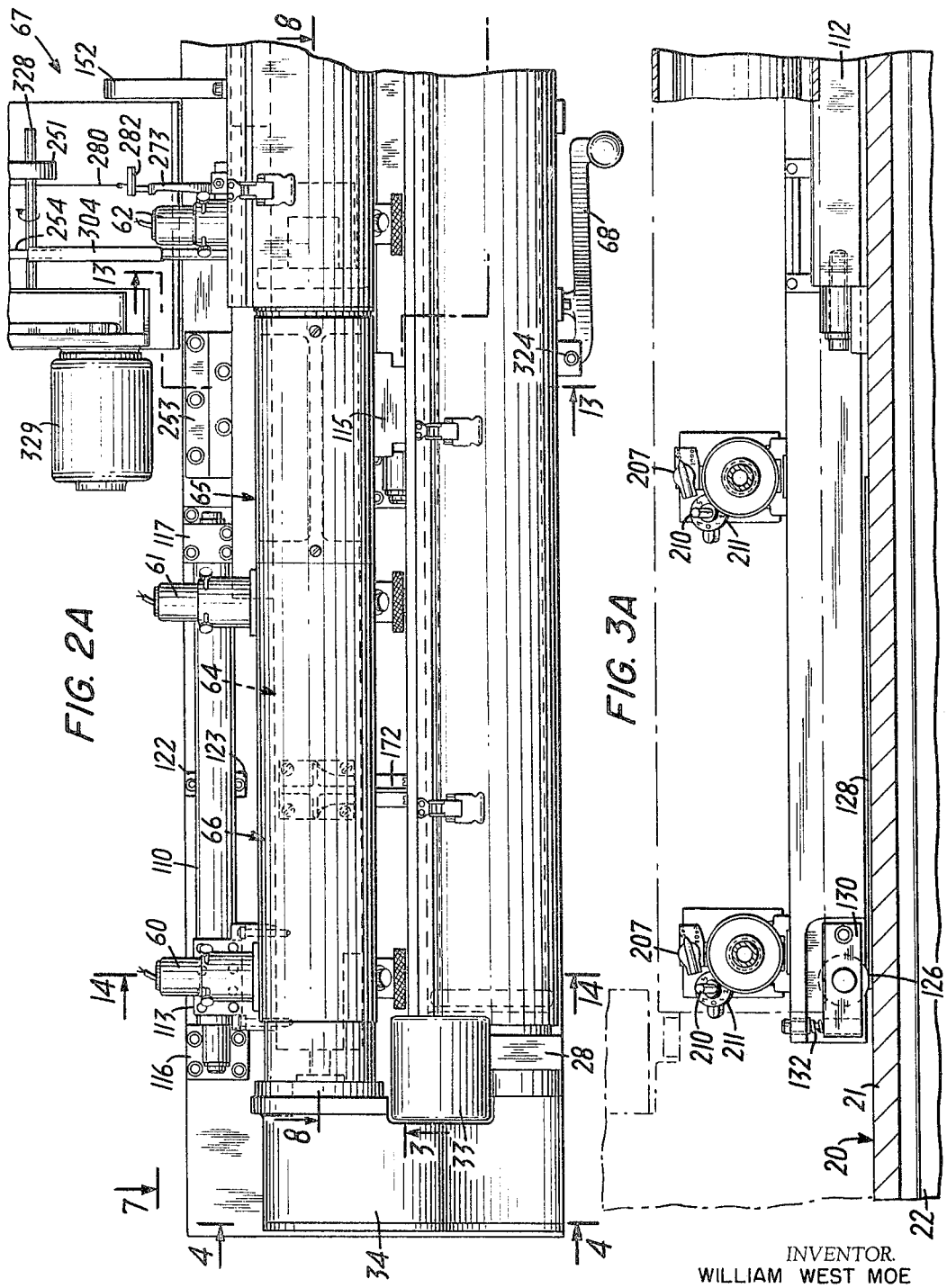

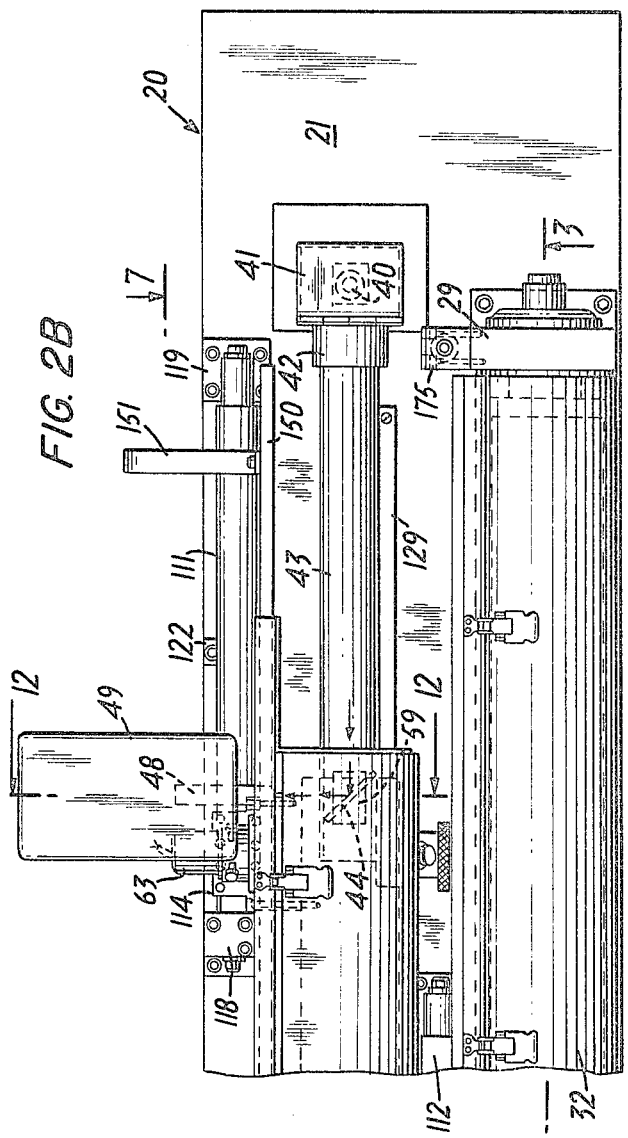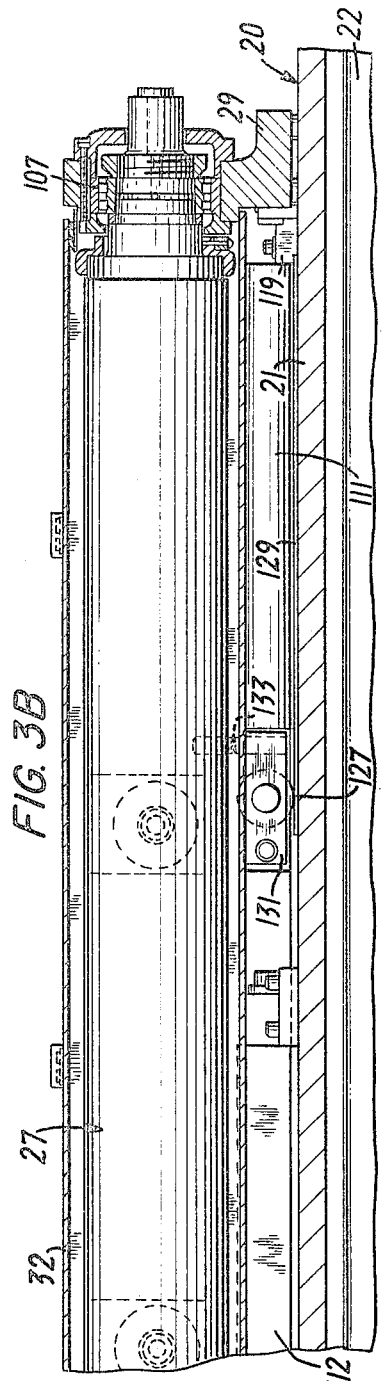

INVENTOR.
WILLIAM WEST MOE
his ATTORNEYS

INVENTOR.
WILLIAM WEST MOE

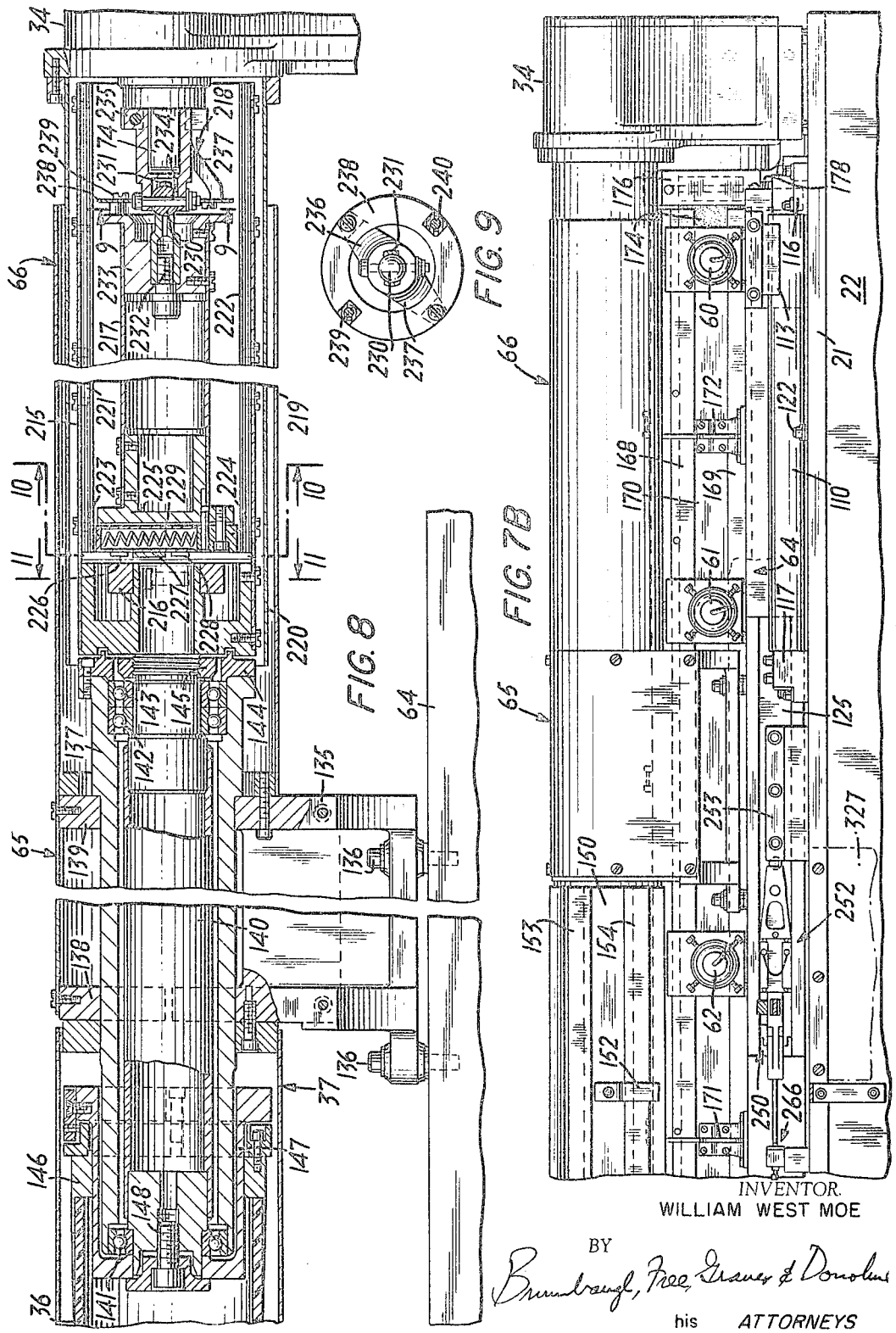

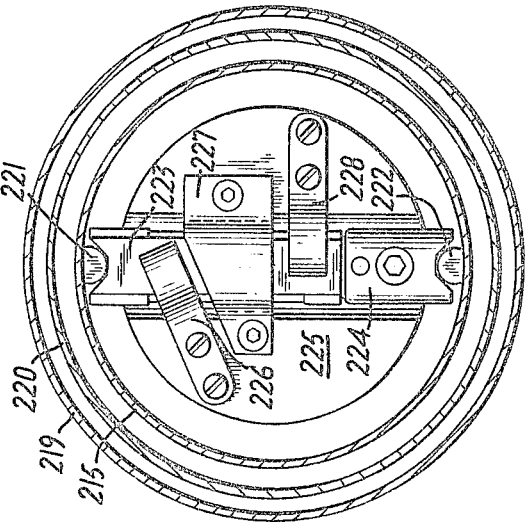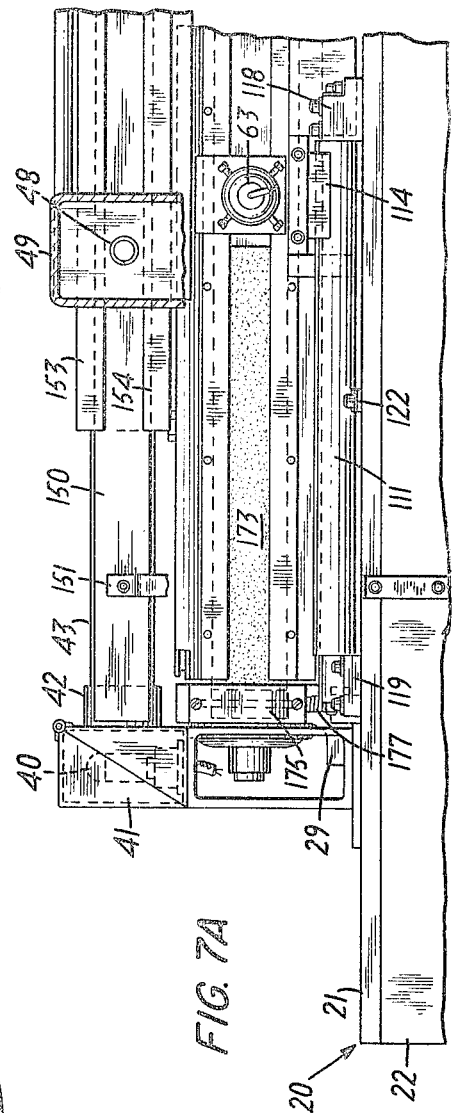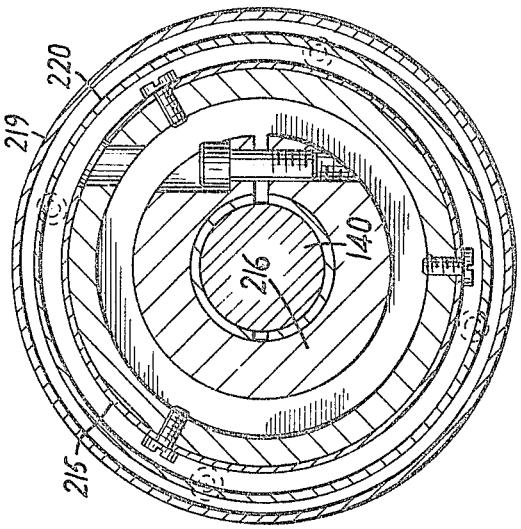

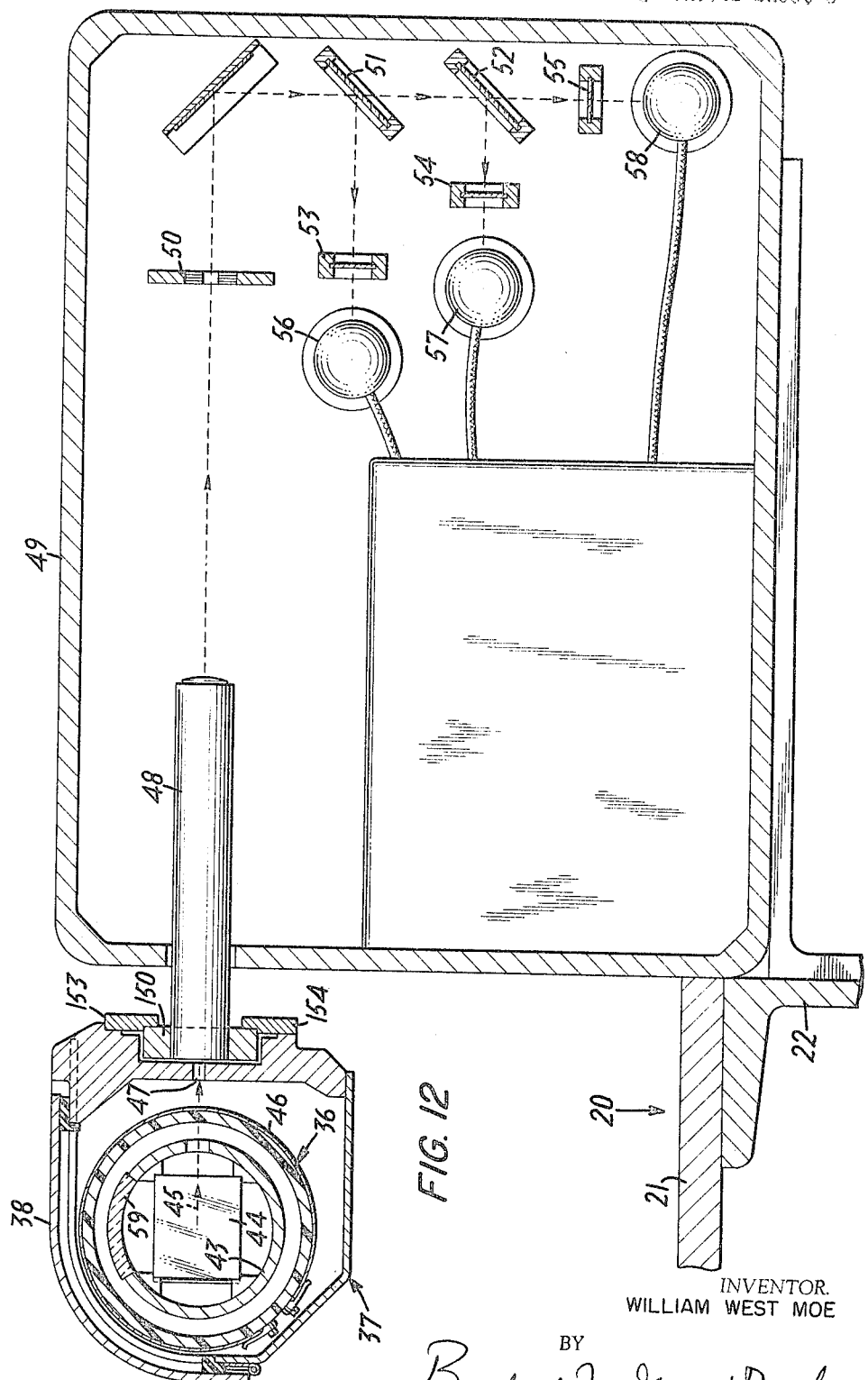

INVENTOR.
WILLIAM WEST MOE

Nov. 29, 1966    W. W. MOE    3,288,925
APPARATUS FOR PREPARING COLOR SEPARATION NEGATIVES
Filed Nov. 28, 1962    15 Sheets-Sheet 11

INVENTOR.
WILLIAM WEST MOE
BY
Brumbaugh, Free, Graves & Donohue
his   ATTORNEYS

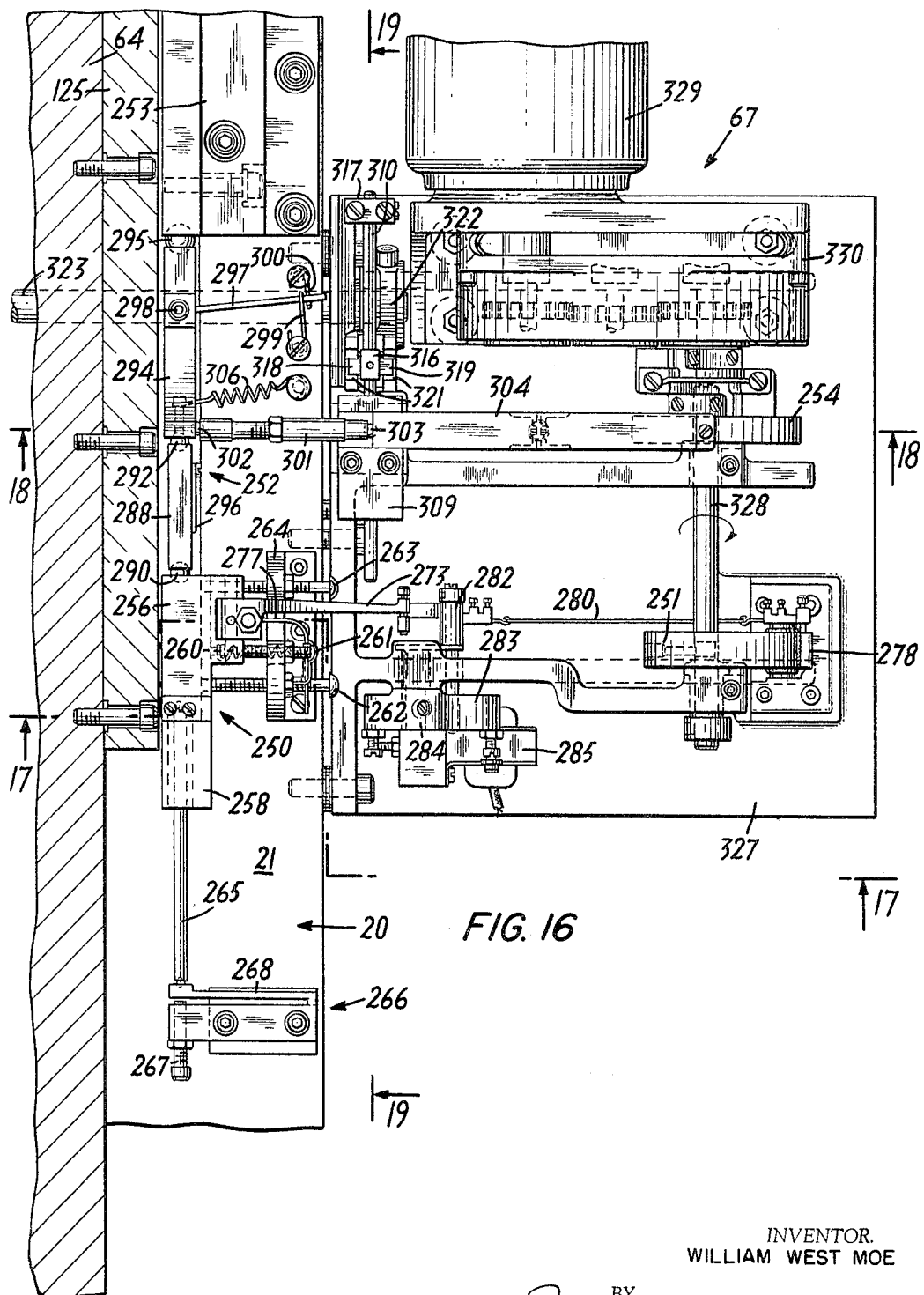

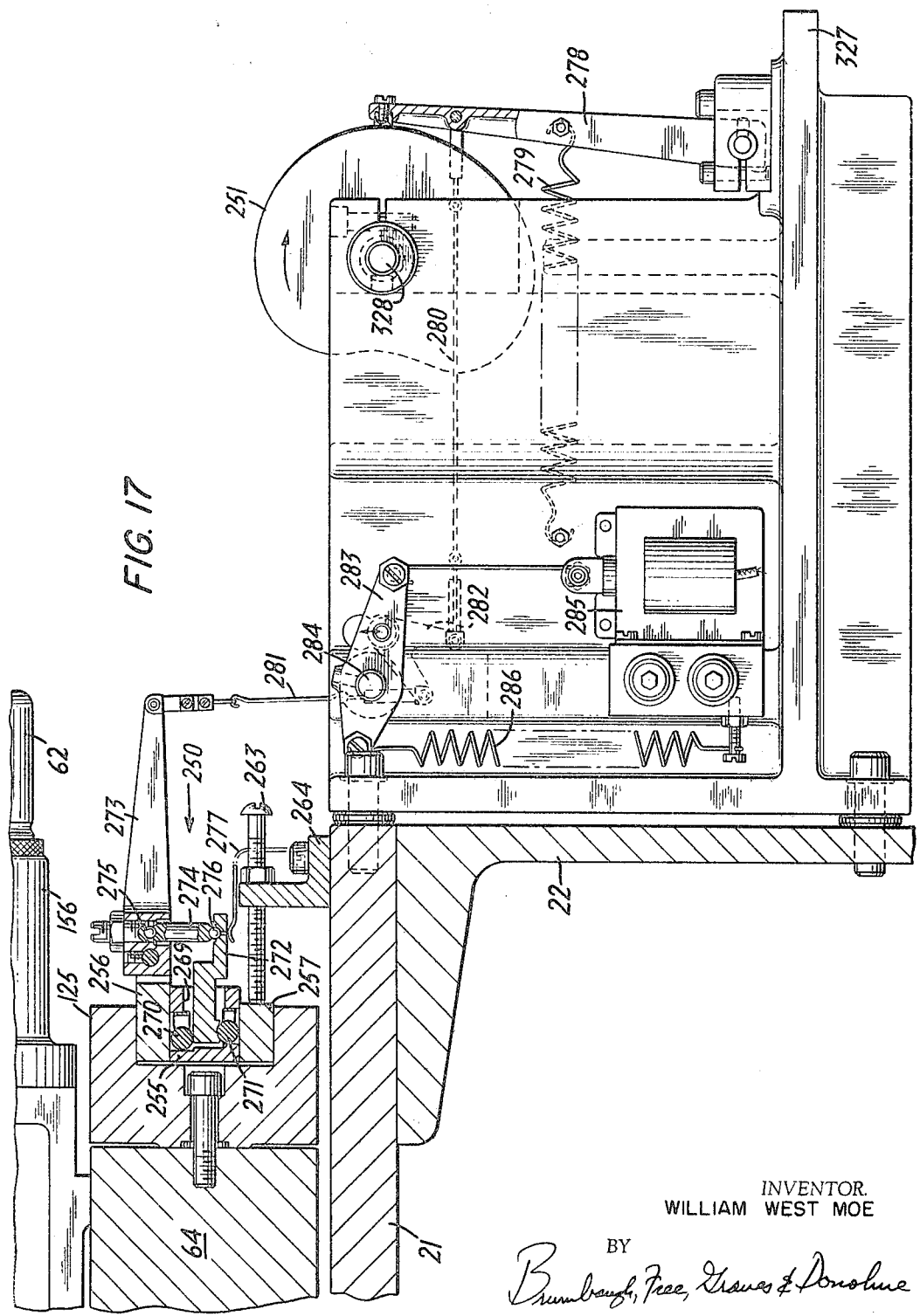

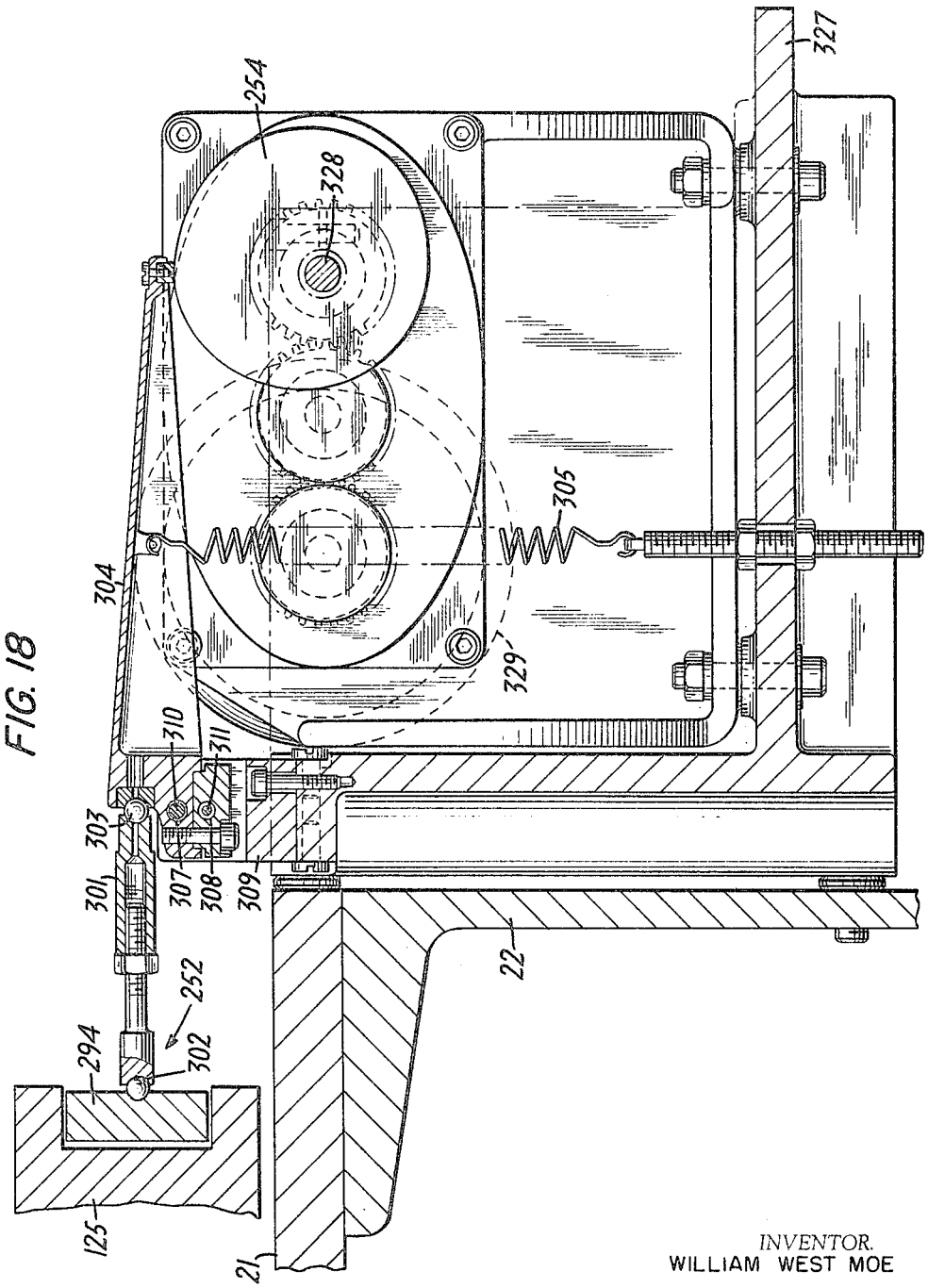

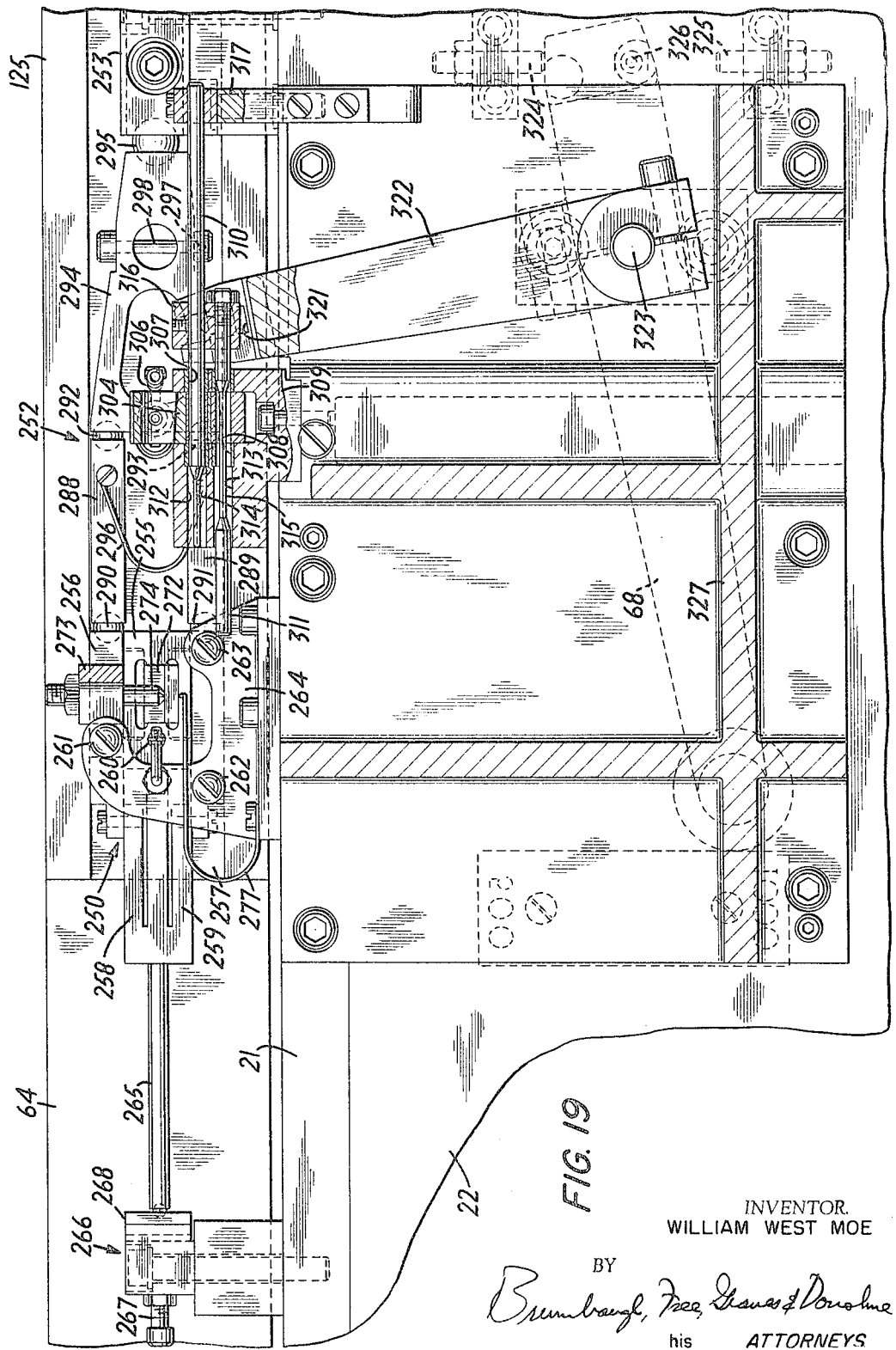

United States Patent Office 3,288,925
Patented Nov. 29, 1966

3,288,925
APPARATUS FOR PREPARING COLOR
SEPARATION NEGATIVES
William West Moe, Stratford, Conn., assignor to Time, Incorporated, New York, N.Y., a corporation of New York
Filed Nov. 28, 1962, Ser. No. 240,642
34 Claims. (Cl. 178—6.7)

This invention relates to apparatus for analyzing color films or the like to produce separation prints representing the various color images and, more particularly, to a new and improved analyzer apparatus arranged to accommodate larger color films and produce larger prints than conventional equipment and to operate with greater efficiency than presently known apparatus.

Customarily, apparatus for analyzing color films wherein the color film is scanned, line by line, and images separated according to color are generated in corresponding lines on separate sheets of film utilize a single spindle or drum on which are mounted both the color film to be analyzed and the separation image-bearing films in order to assure perfect matching of the separation images with each other and with the original color film. Because excessively long spindles are subject to deflection by bending and require massive support structures to prevent displacement with respect to the scanning device, however, color film analyzers of this type have not heretofore been capable of analyzing color films exceeding certain relatively small dimensions, such as eight inches by ten inches, for example. Moreover, the color film analyzers now in use are subject to certain errors in reproduction and are relatively slow in operation.

Accordingly, it is an object of the present invention to provide a new and improved color film analyzer which overcomes the above-mentioned disadvantages of conventional analyzers.

Another object of the invention is to provide a color film analyzer apparatus capable of analyzing color films of larger dimensions without any appreciable increase in weight and size.

A further object of the invention is to provide a color film analyzer operable at higher speed than conventional apparatus.

An additional object of the invention is to provide apparatus of the above character capable of highly accurate reproduction of the analyzer image.

These and other objects of the invention are attained by providing a color film analyzer with at least two film support spindles, a drive system for imparting angular motion to the two spindles simultaneously, a photosensitive device for measuring point by point the brightness of a color film image supported on one of the spindles, an image-reproducing device for imparting a corresponding image point by point to a sensitive material such as film mounted on the other spindle, an indexing mechanism for providing step-by-step relative longitudinal motion between the photosensitive device and the color film spindle, and means for imparting a simultaneous corresponding step-by-step longitudinal relative motion between the image-reproducing device and the other spindle. To assure perfect synchronism of angular motion of the two spindles, they are preferably linked through a gear train wherein all of the gears have the same number of teeth and which is connected to a drive motor through a resilient acceleration compensating device and, to permit relative longitudinal motion between the two spindles, one of them may be joined to the gear train through a spline drive connection having a link which is rigid in the angular and axial directions of the spindle but slightly flexible in directions transverse thereto.

Perfect parallelism of longitudinal motion of the scanning device with respect to one spindle and the image-reproducing device with respect to the other spindle is assured in a simple and effective manner by providing cylindrical ways which are detachably and adjustably mounted on the bed of the apparatus, the bed being a rectangular box structure to provide maximum rigidity with minimum weight and mounting the movable components on a carriage supported on the ways. Indexing of the carriage longitudinally with respect to the other components is accomplished rapidly, efficiently, and with very high accuracy by a reciprocating clutch operating within a channel member which is rigidly attached to the carriage and is centered laterally with respect to the center of resistance of the carriage assembly, the clutch being clamped to the channel member during its motion in one direction and unclamped during motion in the opposite direction. Also, in order to impart reciprocating motion to the clutch, a jointed link, actuated laterally through an oscillating lever, extends longitudinally between the bed of the apparatus and the clutch and, to vary the length of each step motion and thereby control the spacing between successive film image scans, the pivot point of the oscillating lever may be altered. Among the other important features of the invention are the clutch structure which comprises a pair of parallel plates forced against the sides of the channel member by a lever acting between offset rollers and a light aperture which is adjustable in size in two dimensions to control the line-by-line exposure of the photosensitive film by a light source.

Further objects and advantages of the invention will be apparent from a reading of the following description in conjunction with the accompanying drawings, in which:

FIG. 1 is a top perspective view of a representative color film analyzer constructed in accordance with the invention;

FIGS. 2A and 2B, taken together, comprise a plan view of the apparatus shown in FIG. 1;

FIGS. 3A and 3B, taken together, comprise a cross-sectional view, slightly enlarged, taken along the line 3—3 of FIGS. 2A and 2B and looking in the direction of the arrows;

Figure 13:
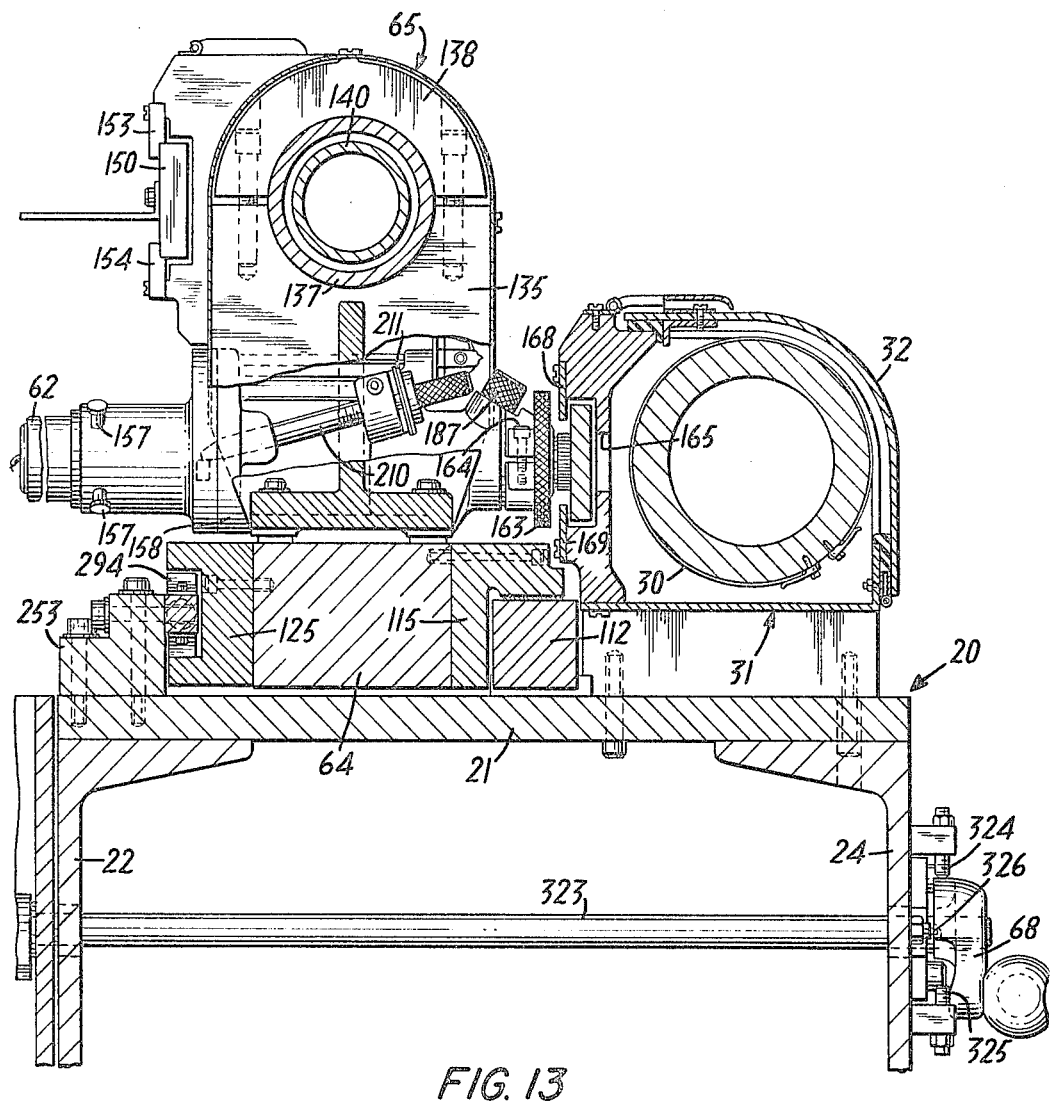
Figure 14:
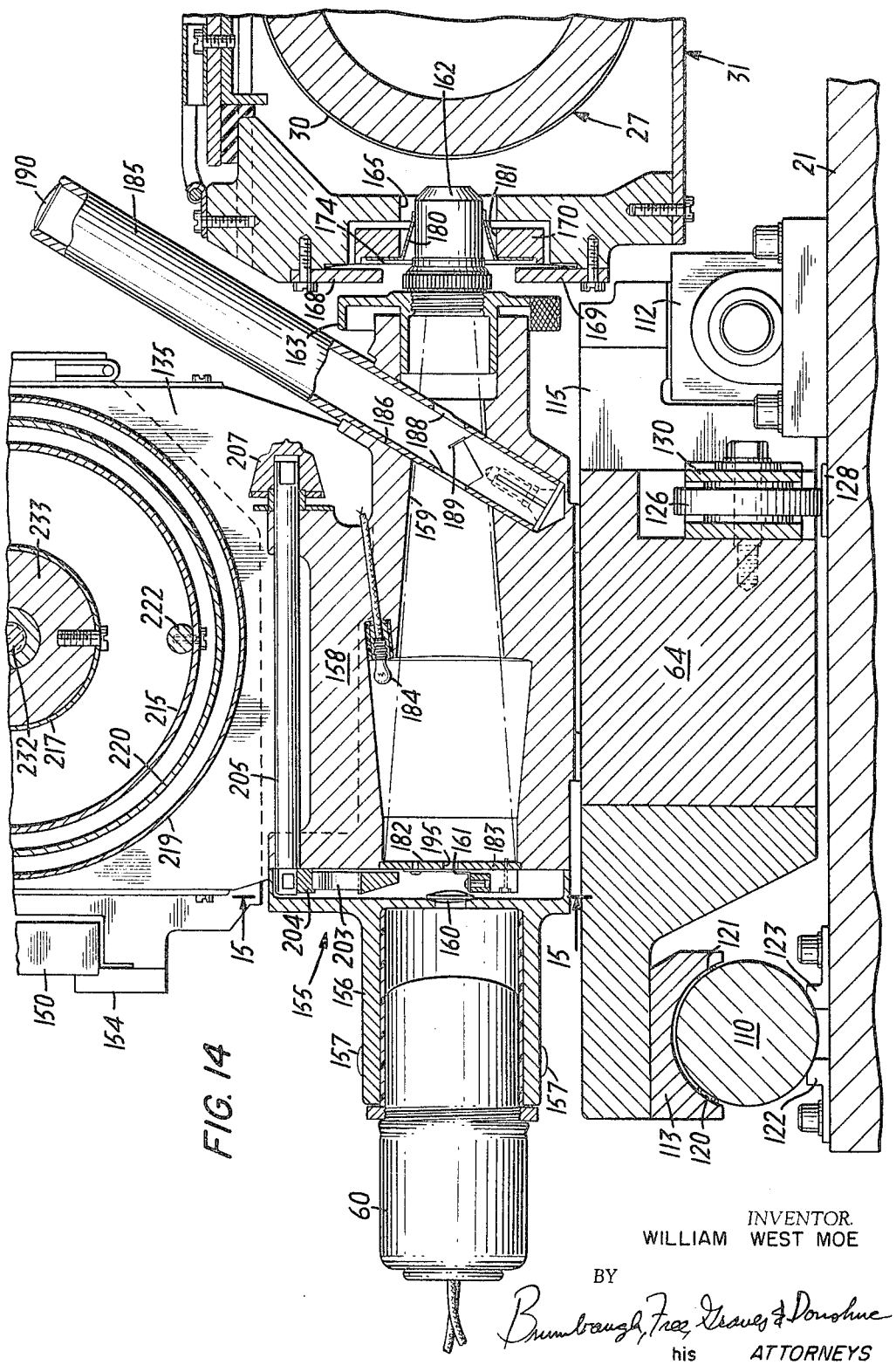
Figure 15:
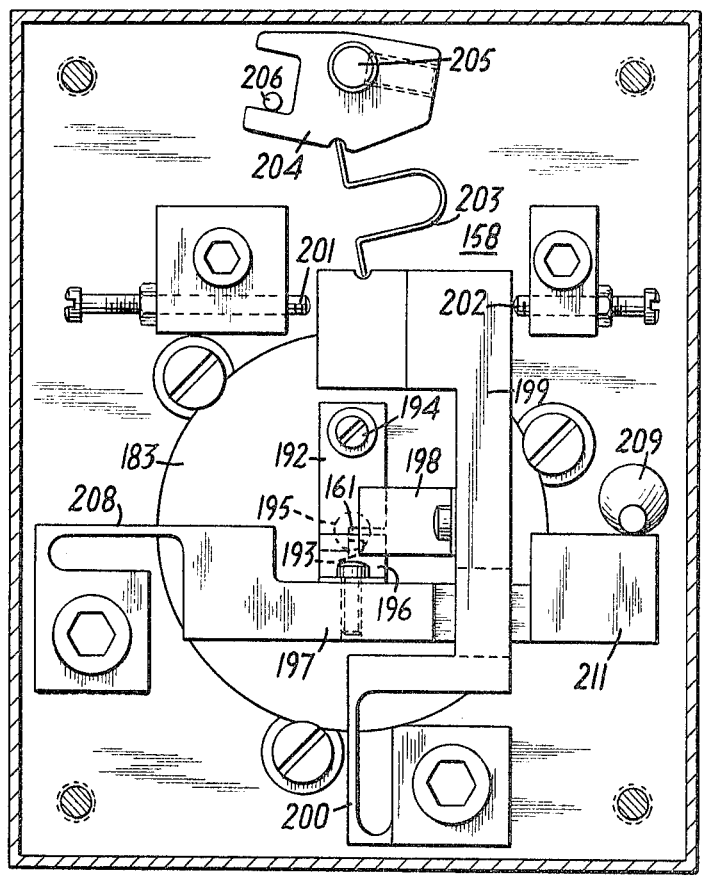

FIGS. 7A and 7B, taken together, comprise a view in section taken along the line 7—7 of FIGS. 2A and 2B and looking in the direction of the arrows to illustrate the rear side of the apparatus;

FIG. 8 is a fragmentary view in longitudinal section, partly broken away, taken along the line 8—8 of FIG. 2A and looking in the direction of the arrows;

FIGS. 9, 10 and 11 are cross-sectional views taken along the correspondingly numbered lines of FIG. 8 and looking in the direction of the arrows;

FIG. 12 is a fragmentary cross-sectional view taken on the line 12—12 of FIG. 2B and looking in the direction of the arrows;

FIGS. 13 and 14 are cross-sectional views taken on the lines 13—13 and 14—14, respectively, of FIG. 2A and looking in the direction of the arrows;

FIG. 15 is a fragmentary view in section taken on the line 15—15 of FIG. 14 illustrating the aperture adjusting mechanism;

FIG. 16 is a plan view, partly in section, illustrating the indexing mechanism for imparting a longitudinal step-by-step motion to the movable carriage; and FIGS. 17, 18 and 19 are sectional views of the indexing mechanism taken on the correspondingly numbered lines of FIG. 16 and looking in the direction of the arrows.

General description

Figure 1:
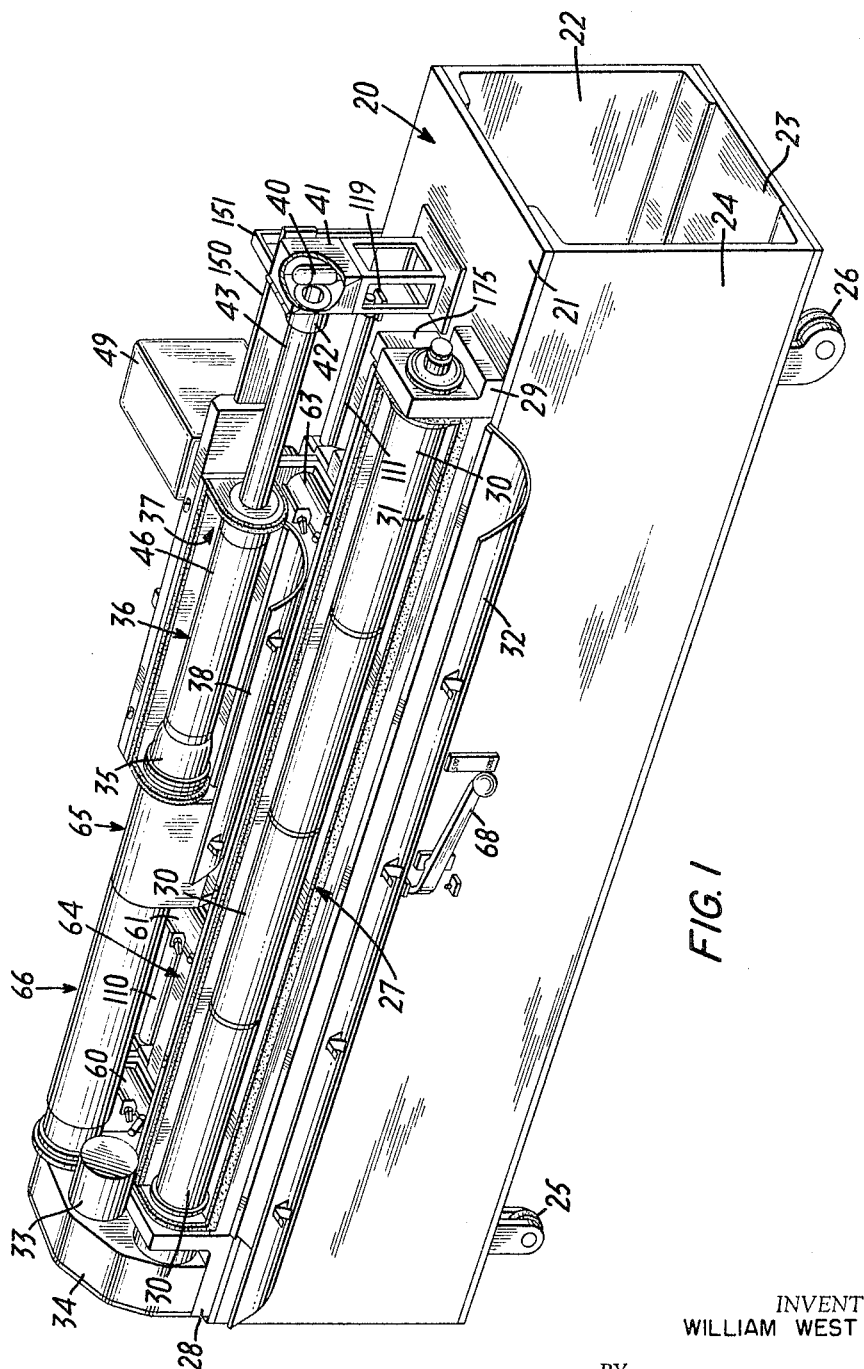

As best seen in the perspective view of FIG. 1, a typical color film analyzing apparatus arranged according to the invention comprises a box-like bed 20 consisting of four metal plates 21, 22, 23 and 24 forming the top, rear, bottom and front, respectively, of the box, and having casters 25, 26 mounted on the bottom plate to facilitate transportation of the apparatus. With the illustrated rectangular bed structure, maximum structural rigidity is obtained with a minimum component weight and, if desired, electronic components or the like may be mounted inside the box.

Along one side of the top surface of the bed 20, a negative spindle 27 is supported for rotation in two pillow blocks 28 and 29, this spindle being, for example, approximately five feet long and adapted to hold four eleven inch by fourteen inch sheets of film 30 on which the color separation images are to be produced. A light-tight housing 31 having a hinged cover 32 encloses the negative spindle and an electric drive motor 33 mounted on a gear box 34 at one end of the apparatus imparts rotary motion to the spindle 27. This motor also drives a positive spindle 35 in synchronism with the negative spindle, the two spindles being mounted in spaced parallel relation, and, attached to the positive spindle 35 is a transparent drum 36 upon which an eleven inch by fourteen inch color film transparency 46 may be mounted. This drum is likewise enclosed by a light-tight housing 37 having a hinged cover 38 to prevent extraneous light from affecting measurement of the image brightness. It will be understood that the words "negative" and "positive" are used herein merely for purposes of identification of the spindles and that, if desired, the transparency on the drum 36 might bear a negative image and the images generated on the sheets of film 30 might be positive, depending on the purpose for which the film analyzer is adapted.

In order to measure the image brightness point by point in the transparency 46 mounted on the drum 36, a beam of light from a source 40 mounted in a housing 41 is directed by a lens within a lens mount 42 through a tube 43 which is slidably received in the positive film spindle housing 37 coaxial with the drum 36, the lens not being visible in the drawings. As illustrated in FIGS. 2B and 12, a mirror 44 mounted diagonally at the end of the tube 43 within the drum 36 reflects a beam of light 45 perpendicularly through the drum and through a transparency 46 mounted thereon so that it passes by way of a longitudinal slot 47 in the housing 37 and a tube 48 into a detector unit 49. In addition, as best seen in FIG. 12, a segment of ground glass 59 is mounted in the top of the tube 43 above the mirror 44 and this may be illuminated from within the tube by a light (not shown) to assist the operator in examining the transparency 46 and aligning selected portions of it with the tube 48 for brightness measurements.

Inside the detector unit 49, the light beam 45, after passing through an aperture 50, is split into three beams by partially reflective mirrors 51 and 52 and these beams are directed through color filters 53, 54, and 55 into corresponding photoelectric cells 56, 57, and 58 in the usual manner. The resulting electrical signals, representing the instantaneous image information for each color as the light beam 45 scans the transparency 46 point by point, are transmitted to conventional electronic apparatus such as that described, for example, in the Hall Patent No. 2,892,016 wherein the color information signals are modified and a "black printer" signal is derived from the three-color signals. Inasmuch as various forms of electronic systems for this purpose are well known in the art and this portion of the system does not constitute a part of the present invention, it is not illustrated or described in detail herein.

Four conventional glow lamps 60, 61, 62, and 63, shown in FIGS. 2A and 2B, receive the three modified color signals and the "black printer" signal produced by the electronic apparatus and generate corresponding light signals having instantaneous intensities proportional to the electric signals applied to them. As will be described in detail hereinafter, the light beam from each of the glow lamps is imaged onto a corresponding sheet of film 30 on the negative spindle 27 and, to enable the detector unit 49 to scan successive lines on the transparency 46 while the glow lamps expose corresponding lines on the sheets of film 30 simultaneously, the glow lamps and the positive spindle 35 are both mounted on a carriage 64 which is slidable on the bed 20 in a direction parallel to both spindles. The positive spindle 35, supported for rotation on the carriage 64 by a mount 65, is slidably linked to the gear box 34 by a spline drive connection 66 and an indexing mechanism 67 imparts longitudinal motion in a step-by-step fashion to the carriage assembly. In the representative embodiment of the invention described herein, each longitudinal displacement imparted to the carriage assembly may be either one-five hundredth inch or one-one thousandth inch and to select the desired displacement, a control handle 68 is mounted on the front of the apparatus.

Rotary drive mechanism

Figure 4:
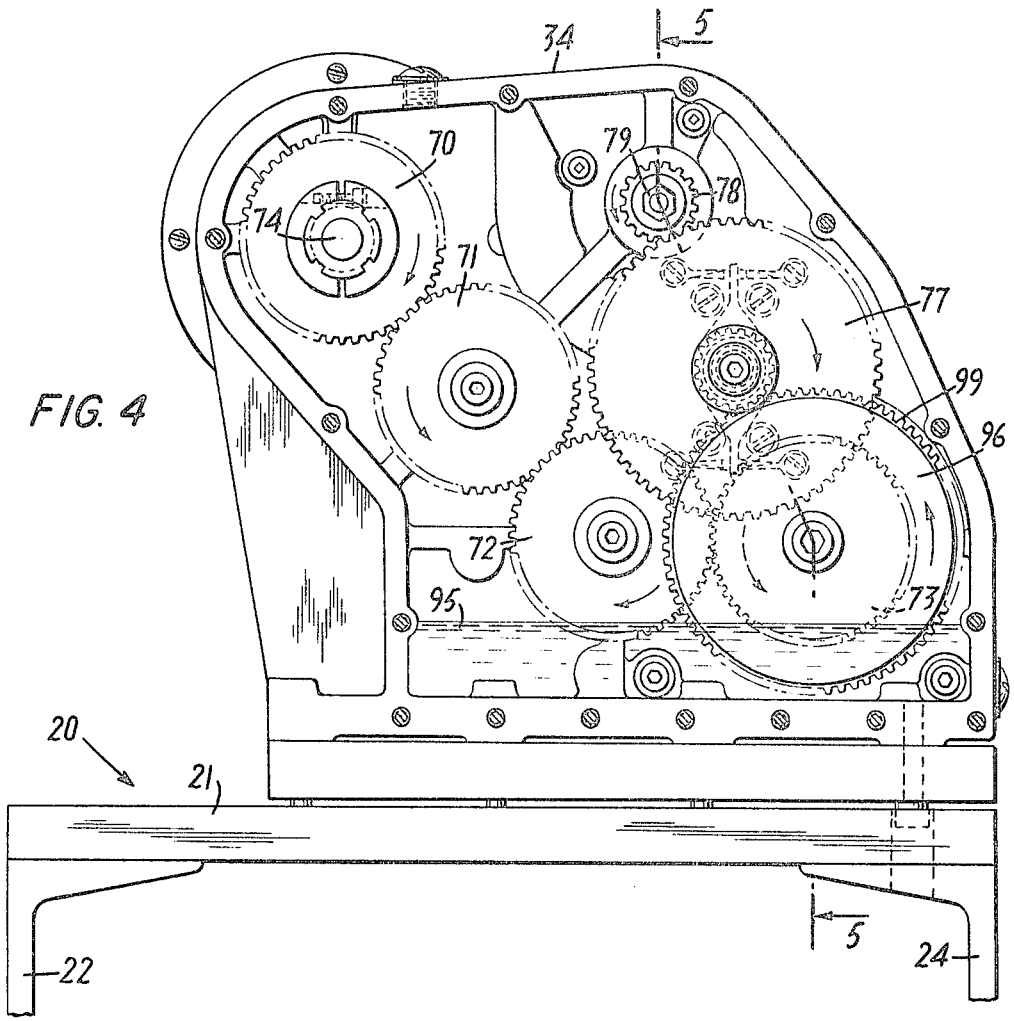
FIG. 4 is a view in section taken along the line 4—4 of FIG. 2A illustrating the rotary drive system for the apparatus.
Figure 5:
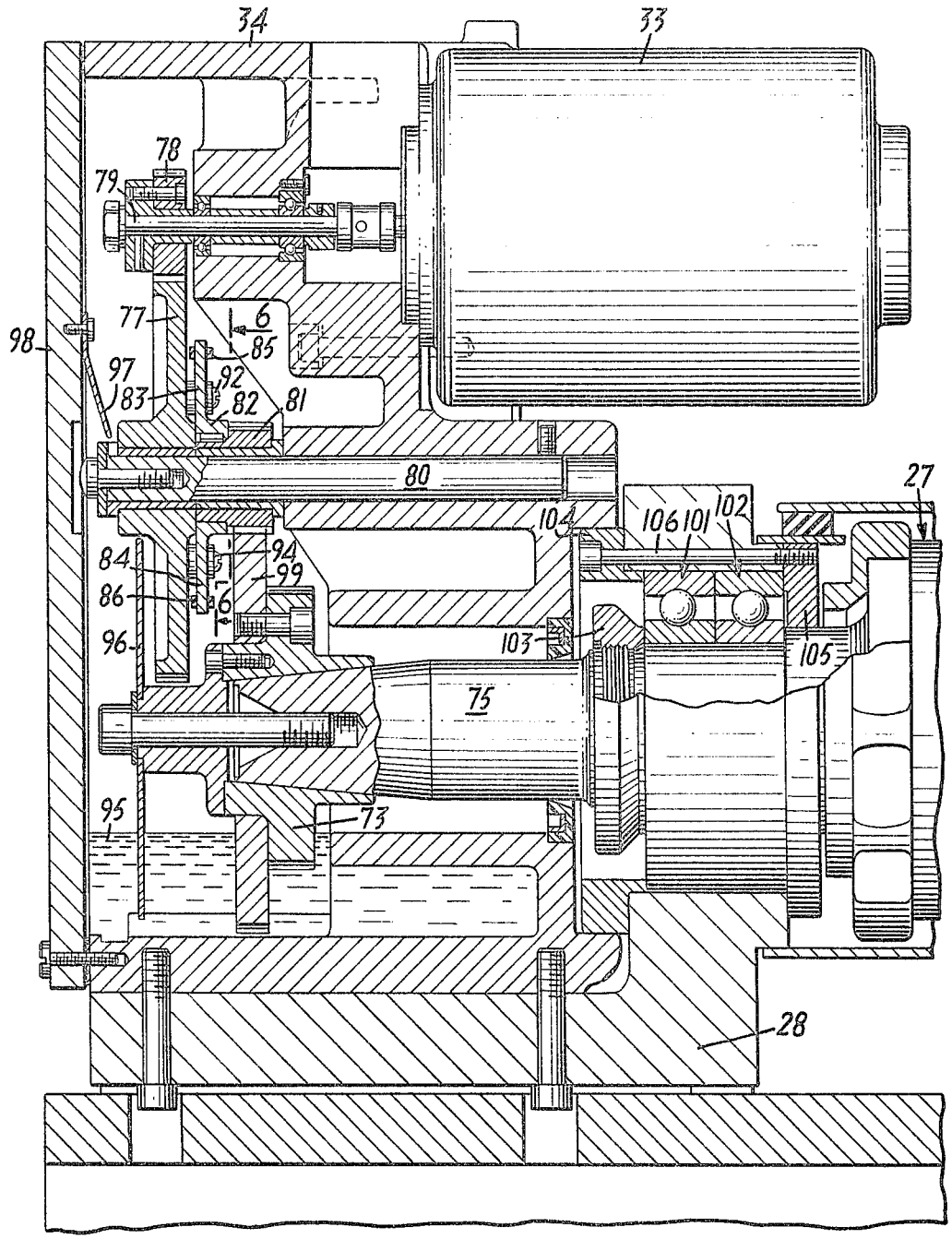
FIG. 5 is a sectional view taken along the line 5—5 of FIG. 4 and looking in the direction of the arrows.

One of the primary advantages of the present invention is the increase in the size of the film which can be analyzed or, conversely, the reduction in weight and size of the apparatus required to analyze film of a given size which results from the provision of separate spindles for the positive color transparency and the negative separation image film. It will be readily apparent, however, that the two spindles must be rotated in exact synchronism if perfect image reproduction is to be obtained. To this end, the connection between the two spindles comprises a plurality of cyclically operative linking members arranged so that, at any given point in the rotary motion of the spindles, the linking members are always in the same relative position. In the particular embodiment of the invention described herein, the linking elements, as shown in FIGS. 4 and 5, comprise four gears 70, 71, 72, and 73 having the same number of teeth, the gear 70 being joined by a shaft 74 to the positive spindle spline connection 66, while the gear 73 is attached to a shaft 75 connected to the negative spindle 27. With this arrangement, any irregularities in the linking elements affect the reproduced images at exactly the same angular location during each rotation, thereby reducing any localized distortion effects in the images.

Figure 6:
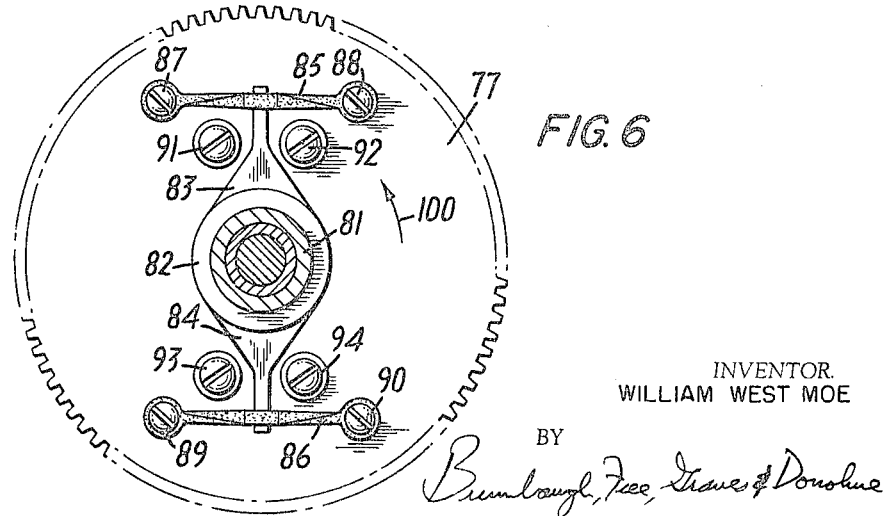
FIG. 6 is a fragmentary sectional view taken along the line 6—6 of FIG. 5 and looking in the direction of the arrows.

A further feature of the rotary drive system is a resilient connection between the drive motor 33 and the gear train which absorbs any minor and momentary motor speed variations that would otherwise tend to reverse the backlash condition in the gear train and thereby introduce a slight change in the angular relation between the two spindles. For this purpose, a gear 77 which engages a pinion 78 mounted on the drive motor shaft 79 is supported for rotation on a fixed shaft 80 upon which a pinion 81 is also rotatably mounted. As best seen in FIG. 6, a coupling member 82 affixed to the pinion 81 is formed with two radial arms 83 and 84 and these are connected through taut resilient strips 85 and 86 to fours screws 87, 88, 89, and 90 affixed to the gear 77. Moreover, four resilient bumpers 91, 92, 93, and 94 are mounted on the gear 77 adjacent to the arms 83 and 84 to limit the angular motion of the arms with respect to the gear. Preferably, the strips 85 and 86 and the bumpers 91–94 are made of a material which is not affected by oil, such as neoprene, since the bottom of the gear box 34 is covered with a supply 95 of lubricating oil which is distributed throughout the box during operation by a disc 96 attached to the negative spindle shaft 75, an oil drip 97 being mounted on the gear box cover plate 98 to lubricate the shaft 80.

To transmit rotary motion to the spindles, the pinion 81 engages a gear 99 affixed to the negative spindle shaft 75. Accordingly, when the drive motor accelerates the spindles to operating speed in the direction of the arrow 100, the inertia of both spindles will stretch the resilient strips 85 and 86 until the bumbers 92 and 93 engage the arms 83 and 84, respectively. When the spindles are rotating at their operating speed, however, the arms 83 and 84 will return to an approximately central position between the bumbers 91 and 92, and 93 and 94 and, if a slight variation in motor speed takes place thereafter, the resilient strips will merely stretch in one direction or the other gradually overcoming the inertia of the spindles without producing any sudden reversal of the backlash condition of the gear train. In this regard, it should be noted that the negative spindle, having greater inertia than the positive spindle, is connected to the gear train between the motor and the positive spindle so that, if the motor speed decreases slightly, the negative spindle acts as the driving member and maintains the same backlash condition in the gear train extending between it and the positive spindle as obtains normally or when the motor speed increases slightly.

As illustrated in FIG. 4, one end of the negative spindle 27 is rotatably supported in the pillow block 28 by two ball bearings 101 and 102. To hold this end of the spindle in fixed position longitudinally, the inner bearing races are clamped tightly together and to the end of the spindle by a nut 103, while the outer bearing races are held rigidly together and to the pillow block by two clamp rings 104 and 105 connected by a series of bolts 106. At the other end of the spindle, as illustrated in FIG. 3B, the inner race of a roller bearing 107 is attached to the spindle and the outer race thereof is clamped to the pillow block 29. By selecting a roller bearing which permits sufficient axial motion of the inner race with respect to the outer race, this arrangement allows for longitudinal expansion of the spindle 27 with respect to the bed 20 as a result of temperature changes, for example, while preventing any relative longitudinal motion between the two.

*Movable carriage assembly*

To support the carriage 64 along with the positive spindle 36 and the glow lamps 60 to 63 for sliding motion parallel to the negative spindle 27, three ways 110, 111, and 112 are mounted on the bed 20 of the apparatus. As best seen in FIGS. 2A, 2B, 7A and 7B, the ways 110 and 111 are longitudinally spaced along one side of the carriage and are cylindrical in shape, while as shown in FIGS. 13 and 14, the ways 112, centrally located on the opposite side of the carriage, are rectangular in cross-section, the carriage being supported on the cylindrical ways by bearing shoes 113 and 114 and on the rectangular ways by a shoe 115. This arrangement not only eliminates the necessity for forming the usual V-shaped grooves in the bed of the apparatus but also permits more accurate alignment of the carriage with respect to the spindles than do conventional ways. For this purpose, each of the cylindrical ways is supported at both ends in adjustable support blocks 116, 117, 118, and 119, these ways having been turned to exactly the same diameter with a high degree of precision. With the support blocks slightly loose, the ways can be shifted until appropriate measurements indicate that they are perfectly parallel to the negative spindle 27 and in line with each other, after which the support blocks are tightened to hold the ways securely in place. After this has been accomplished, strips 120 and 121 of antifriction material such as "Teflon" or the like, as best seen in FIG. 14, are affixed to the shoes 113 and 114 as by a relatively thick layer of epoxy cement and, while the cement is still soft, the shoes are clamped to the ways. After the cement has hardened, the bearing surfaces of the shoes are perfectly aligned with each other so that the carriage can slide smoothly along the ways without any lateral stress. The rectangular ways 112 need only be adjusted so that the top surface is parallel to the axis of the negative spindle 27. To prevent any deflection of the cylindrical ways under the weight of the carriage, additional support elements 122 and 123 are inserted at the mid points of the ways after they have been aligned.

As shown in FIGS. 7B and 13, a channel member 125, which cooperates with the indexing mechanism described hereinafter to advance the carriage, is rigidly attached to one side of the carriage 64 along its entire length. In order to locate the axis of resistance to longitudinal advancing motion within this channel and thereby eliminate any tendency of the carriage assembly to be deflected laterally by a force applied longitudinally to the channel member, the frictional engagement of the shoe 115 with the rectangular ways 112 is reduced to a relatively small value by providing two rollers 126 and 127 located at opposite ends of the carriage along the side adjacent to the ways 112, as best seen in FIGS. 3A and 3B. These rollers, which ride on corresponding support strips 128 and 129 mounted on the bed 20, are supported in pivoted brackets 130 and 131 which are urged toward the bed 20 by adjustable compression springs 132 and 133 which are adjusted to reduce the frictional engagement of the shoe 115 and the ways 112 to the desired extent.

The positive spindle support 65 comprises, as illustrated in FIGS. 8 and 13, a bracket 135 mounted on the carriage 64 by bolts 136 to which a tube 137 is attached by two clamps 138 and 139. Within this tube, a shaft 140 is supported for rotation by three ball bearings 141, 142, and 143, the outer races of the latter two bearings being rigidly attached to the tube 137 by a clamp ring 144 and the inner bearing races being attached to the shaft 140 by a nut 145 so as to prevent any longitudinal motion of the shaft with respect to the carriage 64. At the end of the shaft adjacent to the bearing 141, the transparent drum 36 is held in axial alignment therewith by a ring 146 attached to a support drum 147 which is affixed to the shaft 140 by a bolt 148. Consequently, the transparency support drum 36 is moved longitudinally in unison with the carriage 64 while being supported for rotation thereon, but without permitting any relative longitudinal motion between the two.

In order to permit the beam of light 45 (FIG. 12) to pass out of the positive spindle housing 37 but, at the same time, prevent ambient light from entering the housing, a light shield 150 is provided, as shown in FIGS. 2B, 7A, 7B and 12. This shield, consisting of a rectangular strip supported from the bed 20 by brackets 151 and 152, is slidably received in guides 153 and 154 along the side of the positive spindle housing 37 in which the longitudinal slot 47 is formed and the light tube 48 is mounted in this strip in a position aligned with the slot 47 as shown in FIG. 12.

*Image reproducting system*

As previously mentioned, the glow lamps 60–63, which generate light in accordance with the intensity of the corresponding image color in the positive transparency, are supported for motion with the carriage 64 and, to this end, each of the glow lamps is inserted in an optical system housing 155, best seen in FIG. 14, which is attached to the carriage 64 at a location such that it will move from one end of a sheet of film 30 to the other as the carriage slides longitudinally on the ways. This housing comprises a rear cover member 156 having a bore into which the glow lamp is locked by radial screws 157 and a main body member 158 having a central passageway 159 extending transversely to the direction of carriage motion in line with the glow lamp. At the end of the passageway adjacent to the glow lamp, light from the lamp is directed by a lens 160 through a rectangular aperture 161 which is adjustable in both width and height in the manner described hereinafter.

To expose the film 30 on the negative spindle 27, an objective lens 162, supported in a mount 163 which is slidably received at the other end of the passageway 159, focuses the aperture 161 onto the film 30, the mount being clamped in place by a screw 164, shown in FIG. 13. The objective lens 162, shown in FIG. 14, along with the corresponding lenses for the other glow lamps, projects through a longitudinal slot 165 in the negative spindle housing 31 and, in order to prevent ambient light from reaching the film 30 through this slot, a light shield is interposed between the housing 31 and two baffle members 168 and 169 which are affixed thereto. In the region between the first glow lamp 60 and the last glow lamp 64, this shield comprises a rectangular metal strip 170 mounted on the carriage by support arms 171 and 172, as shown in FIG. 7B, while, at each end of the strip, flexible curtains 173 (FIG. 7A) and 174 (7B) extend from the strip into corresponding housings 175 and 176. Inside these housings, the flexible strips are wound around rollers (not shown) which are urged by corresponding springs 177 and 178 in the direction to wind the curtains onto the rollers. Consequently, the curtains 173 and 174 are maintained in a taut condition between the strip 170 and both roller housings 175 and 176 when the carriage moves parallel to the housing 31. In addition, a conical light baffle 180 (FIG. 14) is mounted in the shield aperture 181 through which each lens 162 projects, so as to prevent light from passing between the lens and the shield while allowing axial motion of the lens for focusing.

In order to facilitate accurate registration of the four sheets of film 30 after they have been exposed and developed, the inner surface 182 of the aperture plate 183 in each of the glow lamp housings carries a conventional register mark pattern (not shown) and a light source 184 is mounted inside the passageway 159 so as to illuminate the pattern but not expose the film directly when energized. Also, before the film analyzing apparatus is operated, a focusing tube 185 is inserted through a hole 186 in the housing 158, this hole being normally covered by a cap 187, as shown in FIG. 13. Openings 188 on opposite sides of the viewing tube permit light from the aperture 161 to be projected onto a sample piece of film mounted on the spindle 27 and the resulting image is reflected by a mirror 189 through a lens 190 at the outer end of the tube for viewing by the operator. While observing the image in this manner, the operator can adjust the lens mount 163 until the best image is observed and then clamp it in place by tightening the screw 164 (FIG. 13). After the viewing tube 185 has been removed and the cap 187 replaced and the four sheets of unexposed film 30 have been mounted on the spindle 27, the register mark pattern on the surface 182 is illuminated momentarily by the bulb 184 simultaneously with the identical pattern in the other glow lamp housing to expose identical marks on the sheets of film outside the image area for use in superimposing the various images produced by the analyzer.

*Aperture adjusting mechanism*

The sectional view of FIG. 15 illustrates in detail the device for forming the rectangular aperture 161 and the mechanism for varying the size of this aperture in two directions. As mentioned previously, the embodiment of the analyzer apparatus described herein is capable of scanning color films at spacings of either five hundred lines per inch or one thousand lines per inch. In order to expose lines of corresponding width on the film 30 (0.002 inch for five hundred line per inch scans and 0.001 inch for one thousand line per inch scans) and thereby provide complete images without gaps between the lines or overlapping of the lines, the rectangular aperture 161 is arranged so that its width can be made either 0.020 inch or 0.010 inch, the objective lens 162 producing a 10 to 1 reduction on the film.

For this purpose, a thin metal plate 192 having a rectangular cutout 193 at one corner is affixed to the aperture plate 182 by a screw 194 so that the inner corner of the cutout 193 is substantially at the center of the plate 182 and overlies a circular hole 195 at the center of the plate. Another thin plate 196 mounted on an arm 197 lies above the plate 192 and adjacent thereto so that its upper edge (as viewed in FIG. 15) forms the bottom of the aperture 161. Similarly, a third plate 198 mounted or an arm 199 is held adjacent to both the plates 192 and 196 so that its edge forms the right hand side of the aperture as viewed in FIG. 15.

The arm 199, having a reduced thickness portion 200, is supported on the housing member 158 for resilient motion in the plane parallel to the aperture plate 182 and is movable in that plane between two adjustable stops 201 and 202. These stops are arranged so that the edge of the plate 198 may be a maximum of 0.020 inch and a minimum of 0.010 inch from the opposite side of the aperture and, to hold the arm selectively against either of these stops, a toggle spring 203 extends between the end of the arm and a toggle block 204 which is attached to the end of a rotatable shaft 205. A stud 206 limits the angular motion of the toggle block so that the shaft will be retained in one of two angular positions and, as best seen in FIGS. 13 and 3A, a pointer 207 at the opposite end of this shaft enables the operator to select the shaft position which results in the aperture width corresponding to the desired scan line spacing.

To control the film exposure for a given glow lamp intensity, the height of the rectangular aperture 161 is made variable. This is accomplished by providing a resilient reduced thickness portion 208 in the arm 197 and, in this instance, the arm is mounted on the housing 158 so that the resilient portion urges the arm upwardly, is viewed in FIG. 15, against the conical tip 209 of a shaft 210 which is set at an angle to the optical axis in the housing member 158, as illustrated in FIG. 13. This shaft, being threaded in the housing member 158, forces the free end 211 of the arm 197 downwardly as the shaft is advanced in its axial direction by rotation, thereby increasing the vertical height of the aperture 161 and, as shown in FIG. 3A, a scale 212 affixed to the shaft indicates to the operator the height of the aperture at various shaft orientations so as to enable him to set the height to a selected value in accordance with the desired film exposure.

*Spline drive connection*

FIGURES 8, 9, 10, and 11 illustrate the manner in which the positive spindle support shaft 140 and the gear box output shaft 74 are connected so as to transmit rotation to the positive spindle while permitting axial motion thereof. As best seen in FIG. 8, this connection comprises an outer drive tube 215 affixed to the shaft 140 by a clamp 216 and a concentric inner drive tube 217 connected through a flexible link 218 to the output shaft 74, the connection being protected by an outer guard tube 219 mounted on the spindle support bracket 135 and an inner guard tube 220 bolted to the gear box 34, both of which are concentric with the drive tubes. To connect the inner and outer drive tubes for relative sliding motion, two rails 221 and 222 are affixed in diametrically opposite positions along the inside surface of the outer drive tube 215, parallel to the axis thereof, and two V-blocks 223 and 224 engaging these rails are mounted on an end piece 225 attached to the free end of the inner drive tube 217. As best seen in FIG. 10, the block 224 is rigidly attached to the end piece 225 to slide on the rail 222 while the block 223 is supported in guides 226, 227, and 228 for radial sliding motion and, as shown in FIG. 8, is urged against the rail 221 by an internal helical spring 229. Accordingly, the outer tube 215 is rotatably driven by the inner tube 217 at all axial relative positions of the two tubes without permitting any relative angular motion of the tubes.

In order to allow slight deflection of the inner drive tube 217 with respect to the axis of the gear box output shaft 74 and thereby allow greater tolerance in the alignment of the tubes, the joint 218 is arranged so that it is rigid in the axial and angular directions of the tube but is slightly flexible in other directions. To accomplish this, a rod end bearing comprising a ball 230, supported in an annular socket 231, is attached by a bolt 232 to an end piece 233 in the tube 217 and a bolt 234 passes through the ball to join it to a driving member 235 which is clamped to the shaft 74. As shown in FIG. 9, two radially projecting dogs 236 and 237 support an annular washer 238 made of reaItively thin, slightly resilient material at diametrically opposite locations from the member 235 and, at two points angularly displaced from these locations, the washer 238 is attached by bolts 239 and 240 to the end piece 233. As a result, the tube 217 is rigidly connected to the shaft 74 for rotary motion therewith and is fixed in the axial direction but can be deflected slightly from the axis of that shaft without affecting the rotary connection.

*Indexing mechanism*

To impart uniform longitudinal displacements of precise magnitude to the carriage 64, the indexing mechanism 67, shown in FIGS. 16–19, comprises a clutch 250 driven by a rotary cam 251 to engage the channel 125 intermittently and a jointed link 252 extending between the clutch and a rigid support 253 affixed to the bed 20 and actuated intermittently in conjunction with the clutch operation by a cam 254 to extend and contract in the longitudinal direction of the channel 125. More particularly, the clutch 250 comprises a block 255 to which two plates 256 and 257 located above and below the block are attached by resilient extensions 258 and 259, respectively. The extensions 258 and 259 normally retain the plates 256 and 257 against the top and bottom surfaces of the block, respectively, but can be deflected sufficiently to permit slight vertical motion of these plates away from the block. Furthermore, the block 255 is supported in the channel 125 so that the plates 256 and 257 can engage the upper and lower side walls thereof firmly by a slight displacement away from the block and the block and plate assembly is suspended away from the bottom surface of the channel, as shown in FIG. 17, by a spring 260 (FIG. 16) urging it outwardly against three adjustable stops 261, 262, and 263 mounted in a support 264 attached to the bed 20. In its normal unactuated condition, therefore, the lower plate 257 rests on the lower side channel surface, while the upper plate 256 is spaced very slightly from the upper side channel surface. In addition, as shown in FIGS. 16 and 19, a shaft 265 extends longitudinally from one end of the block to engage a resilient stop arrangement 266 rigidly attached to the bed 20. This component includes an adjustable stop member 267 which positively limits the motion of the shaft 265 in one longitudinal direction and a spring member 268 which urges the shaft 265 in the opposite direction.

Within a cavity 269 in the block 255 there are disposed two parallel rollers 270 and 271, shown in FIG. 17, which engage the plates 256 and 257, respectively, through corresponding openings in the top and bottom of the block and are displaced slightly in the direction perpendicular to the bottom surface of the channel 125. Accordingly, a clamp lever 272 extending between these two rollers is effective by downward vertical motion of its free end to force the rollers apart and thereby clamp the plates 256 and 257 rigidly against the walls of the channel. To impart the clamping motion to the lever 272, another lever 273 is supported for pivotal motion from the top plate 256 and a bar 274 extends vertically between two ball joints 275 and 276 to transmit vertical motion from the lever 273 to the lever 272, the latter lever being urged upwardly by a spring 277. Inasmuch as all of the motions involved in the clamping action of the clutch are rolling motions, it will be readily apparent that the clutch action is accomplished with maximum efficiency and the greatest possible accuracy.

To actuate the clutch, a cam follower arm 278, held against the cam 251 by a spring 279, actuates the lever 273 through two links 280 and 281 connected to a bell crank 282 which is pivotally supported on a lever 283 at a location spaced from the fulcrum 284 thereof. At the end adjacent to the bell crank 282, this lever is linked to a solenoid 285 adapted to pull the lever in the clockwise direction to the position illustrated in FIG. 17 when energized, while at the other end of the lever 283, a restoring spring 286 urges the lever in a counterclockwise direction. Accordingly, as long as the solenoid 285 is in the energized position, as during operation of the analyzer, the cam 251, acting through the links 280 and 281 and the bell crank 282, can actuate the clutch 250 intermittently to clamp the plates 256 and 257 to the channel 125. When the solenoid 285 is released, however, the bell crank 282 is raised by the lever 283 so that the link 281 can no longer move the lever 273 downwardly far enough to clamp the clutch to the channel. Accordingly, in this condition, the carriage 64 can be moved freely in the longitudinal direction by the operator regardless of the portion of the cam 251 engaged by the follower 278.

The jointed link 252 comprises two bars 288 and 289 disposed within the channel 125 parallel to the axis thereof, each formed at both ends with spherical seating surfaces. Corresponding seating surfaces are formed in the adjacent ends of the plates 256 and 257 and two balls 290 and 291 are inserted between the adjacent ends of the bars 288 and 289 and the corresponding plates 256 and 257, respectively, so as to provide a jointed connection between them. Similarly, two further balls 292 and 293 are inserted in the seating surfaces at the opposite ends of the bars 288 and 289 and in corresponding sockets in one end of a second link member 294 and a further ball 295 forms a joint between the link member 294 and the rigid support block 253. A length of stiff wire 296 joins the two bars 288 and 289 to prevent rotation thereof about their axes and, to avoid twisting of the jointed link assembly, another stiff wire 297 attached to a rotatable vertical post 298 on the member 294 is slidably received between two horizontal guides 299 and 300.

Actuation of the jointed link assembly 252 is accomplished by a drive rod 301 of adjustable length which extends generally perpendicularly to the link 294 and forms a ball joint 302 therewith adjacent to the bars 288 and 289. At its other end, the rod 301 forms a similar joint 303 with a cam follower 304 which, as best seen in FIG. 19, is held downwardly against the cam 254 by a spring 305, the link member 294 being urged toward the rod 301 and the follower 304 by another spring 306, as shown in FIG. 16. Inasmuch as the magnitude of displacement of the carriage 64 depends on the lever action of the follower 304 during each rotation of the cam 254 and two different displacement magnitudes are required to permit either five hundred lines per inch or one thousand lines per inch scanning, the cam follower is made with two different pivot points, either of which may be selected from the front of the apparatus by operating the control handle 68.

In this regard, as shown in FIGS. 18 and 19, the follower 304 is formed with two spaced transverse bores 307 and 308 below the ball joint 303, the lower bore 308 being twice as far from the joint as the upper bore 307, and the follower is supported laterally in a bracket 309 in which two parallel rods 310 and 311 are slidably received in corresponding transverse openings 312 and 313. Both of these rods have a reduced diameter section 314 and 315 and these sections are longitudinally spaced from each other so that whenever one full diameter rod portion is positioned in one of the bores 307 and 308, the reduced diameter section of the other rod is located in the other bore, both rods being affixed to a support block 316 for simultaneous longitudinal motion guided by a guide block 317 which slidably receives the rod 316. Accordingly, by moving the block 316 and the rods longitudinally with respect to the bores 307 and 308, the pivot point providing the desired displacement magnitude can be selected and, to accomplish this, the block 316 has lateral projections 318 and 319 which are confined in parallel slots 321 at the end of a crank arm 322 attached to the control handle 68 by a transverse shaft 323. Two stops 324 and 325 on the front of the machine limit the angular motion of the control handle and a ball detent device 326 cooperates with the handle to releasably retain the rods 310 and 311 in either of the two pivot positions.

The drive system for the indexing mechanism is supported on a frame 327 attached to the bed 20 and the two cams 251 and 254 are driven by a shaft 328 which is rotatably supported on the frame and is connected to a synchronous drive motor 329 through a gear box 330. Inasmuch as the advancing motion of the indexing mechanism takes place at exactly the same time and in precisely the same manner during each line of scanning, the indexing mechanism drive motor 329 need not be controlled to actuate the mechanism at any particular time during the rotation of the spindles 27 and 36. The only requirements of this mechanism are that the cam drive shaft 328 must have the same operating speed as the spindles and the jointed link actuating cam 254 must be shaped so as to avoid any motion of the jointed link during the clutch clamping and unclamping motions imparted by the cam 251.

*Operation*

In operation, after the light apertures 161 have been focused on sample film mounted on the negative spindle 27 in the manner previously described, four sheets of unexposed film 30 are mounted on this spindle and the cover 32 is closed. A color transparency 46 is affixed to the transparent drum 36 of the positive spindle end, with the lamp 40 illuminated, the operator selects the appropriate portions of the transparency by viewing it against the ground glass 59 (FIG. 12) and makes the necessary brightness determinations by aligning these portions with the tube 48 of the detector unit 49. At this stage, the indexing mechanism solenoid 285 is not energized and the operator can slide the carriage 64 by hand for alignment of the selected parts of the transparency with this tube. The illuminating light from the ground glass 59 is then turned off, the positive spindle housing cover 38 is closed, and the carriage 64 is moved manually to the end of the ways closest to the gear box 34, as shown in FIG. 1, or to a location corresponding to the end of the transparency 46, if it is smaller than the maximum size. With the spindle 27 oriented so that locations on the films 30 outside the image area are adjacent to the lenses 162 (FIG. 14), the lamps 184 inside the glow lamp housings 158 are energized momentarily to expose register marks on the sheets of film. In addition, the control handle 68 and the aperture width control knobs 27 are set for the desired scanning rate of five hundred or one thousand lines per inch and the aperture height control knobs 210 (FIG. 3A) are adjusted to provide the required film exposure.

Upon energization of the rotary drive motor 33, the spindles are brought up to operating speed and, when this speed is achieved, the indexing mechanism drive motor 329 and the glow lamps 60 to 63 are turned on. At the same time, the indexing mechanism solenoid 285 is actuated to render the clutch 250 operable by the cam 251. Thereafter, each of the glow lamps is illuminated according to the instantaneous brightness of the corresponding color in the transparence image and, consequently, exposes a corresponding image on one of the sheets of film 30. Once during each rotation of the spindles, the cam 251 causes the lever 272 to clamp the plates 256 and 257 (FIG. 17) to the channel member 125 and, when this operation has been completed, the cam 254 pivots the follower 304 about the selected pivot rod 310 or 311 causing the jointed link 252 to straighten out and move the clutch 250, the channel member 125 and the carriage 64, with its glow lamps and positive spindle, exactly one-thousandth or two-thousandths of an inch along the ways depending on the selector setting. After the clutch 250 is released, the spring 306 and the cam 254 cause the jointed link 252 to buckle slightly and the spring 268 restores the clutch 250 to its original longitudinal position with respect to the bed 20.

Because the channel member 125 is rigidly attached to the carriage 64 throughout its length and the center of resistance of the system is located within the channel, no lateral deflection of the carriage assembly takes place when the longuitudinal displacing force is applied nor can the channel member be deflected with respect to the carriage. Consequently, the magnitude of the carriage displacement is not only highly accurate but perfectly reproducible. It will be understood, of course, that the displacement magnitude is determined by the relation of the components of the jointed link before and after actuation and that this can be controlled by the shape of the cam 254, the locations of the pivot rods 310 and 311 and the length of the adjustable drive rod 301. After the entire transparency has been scanned in this manner, the films 30 are removed from the spindle 27 and processed in the usual manner.

Although the invention has been described herein with reference to a specific embodiment, many modifications and variations therein will readily occur to those skilled in the art. For example, if it is desirable to analyze even larger transparencies than eleven by fourteen inches without increasing the total negative spindle length, two or more negative spindles, each driven synchronously with the positive spindle in the manner described herein, might be provided, the glow lamps being arranged in an appropriate manner on the carriage. Moreover, it will be apparent that the positive spindle 36 may be mounted in longitudinally fixed position and the detector unit 49 affixed to the carriage 64 for motion with respect to the bed 20. Accordingly, all such variations and modifications are included within the intended scope of the invention as defined by the following claims.

I claim:

1. Image reproducing apparatus comprising a base member, a first image medium support member for supporting an image-bearing medium for angular motion about a first axis, a second image medium support member for supporting an image receiving medium for angular motion about a second axis which is displaced from the first axis, mounting means for mounting one of the first and second image medium support members in longitudinally fixed position on the base member, means for detecting an image on a medium supported on the first member and producing a corresponding image on a medium supported on the second member, drive means connected to impart angular motion to one of the members, and coupling means connecting the two members for simultaneous angular motion in precisely repetitive angular relation.

2. Image reproducing apparatus comprising a first image medium support member for supporting an image-bearing medium for angular motion about a first axis, a second image medium support member for supporting an image receiving medium for angular motion about a second axis which is displaced from the first axis, means for detecting an image on a medium supported on the first member and producing a corresponding image on a medium supported on the second member, drive means connected to impart angular motion to one of the members, and coupling means connecting the two members for simultaneous angular motion in precisely repetitive angular relation, wherein the coupling means includes at least one cyclically operative coupling element which is linked to the two members so that, at any selected angular position of a given one of the members, the coupling element is in the same position during every cycle of operation of said given one of the members.

3. Image reproducing apparatus according to claim 2 wherein the coupling element comprises an idler gear having a selected number of gear teeth and including another gear member having a total number of teeth which is an integral multiple of said selected number.

4. Image reproducing apparatus comprising a first image medium support member for supporting an image-bearing medium for angular motion about a first axis, a second image medium support member for supporting an image receiving medium for angular motion about a second axis which is displaced from the first axis, means for detecting an image on a medium supported on the first member and producing a corresponding image on a medium supported on the second member, drive means connected to impart angular motion to one of the members, and coupling means connecting the two members for simultaneous angular motion in precisely repetitive angular relation, wherein the two members have different moments of inertia and the drive means is connected to impart angular motion to the member having the higher moment of inertia.

5. Image reproducing apparatus comprising a first image medium support member for supporting an image-bearing medium for angular motion about a first axis, a second image medium support member for supporting an image receiving medium for angular motion about a second axis which is displaced from the first axis, means for detecting an image on a medium supported on the first member and producing a corresponding image on a medium supported on the second member, drive means connected to impart angular motion to one of the members, and coupling means connecting the two members for simultaneous angular motion in precisely repetitive angular relation, including resilient means interposed between the drive means and said one member whereby slight variations in the angular speed of the drive means are absorbed by the resilient means without substantially affecting the angular speed of said one member.

6. In apparatus including two members supported for angular motion about axes displaced from each other and drive means for imparting angular motion to one of the members, coupling means connecting the two members for simultaneous angular motion in precisely repetitive angular relation including at least one cyclically operative idler gear which is linked to the two members so that, at any selected angular position of a given one of the members, the idler gear is in the same position during every cycle of operation of said given one of the members.

7. Image reproducing apparatus comprising a first rotatable image medium support member for supporting an image bearing medium, a second rotatable image medium support member for supporting an image receiving medium in parallel adjacent relation to the first member, drive means connected to impart rotary motion to one of the members, resilient means interposed between the drive means and said one member whereby slight variations in the rotary speed of the drive means are absorbed, coupling means connecting said one member to the other member for simultaneous rotary motion in precisely repetitive angular relaiton therewith, means for detecting an image on a medium supported on the first member, means for producing a corresponding image on a medium supported on the second member, and reciprocating jointed link means for imparting simultaneous relative motions between the detecting means and the first support member and between the image producing means and the second support member in directions parallel to the axes of the members.

8. Image reproducing apparatus comprising a base member, a first image medium support member for supporting an image bearing medium, means for detecting an image on the image bearing medium supported for linear motion relative to the first support member, a second image medium support member for supporting an image receiving medium, mounting means for mounting one of the first and second image medium support members in longitudinally fixed position on the base member, means for producing an image on the image receiving medium supported for linear motion relative to the second support member, and reciprocating jointed link means acting between the first and second members and the detecting and reproducing means respectively to impart the relative linear motions simultaneously.

9. Image reproducing apparatus comprising a first image medium support member for supporting an image bearing medium, means for detecting an image on the image bearing medium supported for linear motion relative to the first support member, a second image medium support member for supporting an image receiving medium, means for producing an image on the image receiving medium supported for linear motion relative to the second support member, reciprocating jointed link means acting between the first and second members and the detecting and reproducing means respectively to impart the relative linear motions simultaneously, bed means for supporting one of the first support member and the detecting means and one of the second support member and the producing means in fixed position with respect to one dimension, carriage means for supporting the other of the first support means and the detecting means and the other of the second support means and the producing means in fixed relation with respect to said one dimension and for linear motion in said one dimension with respect to the bed means, rigid bar means elongated in said one dimension affixed to the carriage means along the entire length of the bar means, and clutch means reciprocable in said one dimension with respect to the bed means by the jointed link means and cyclically operative to engage and disengage said bar means.

10. Image reproducing apparatus according to claim 9 wherein the jointed link means comprises a first elongated link element extending generally parallel to said one dimension and connected to the clutch means for angular motion with respect thereto, a second elongated link element extending generally parallel to said one dimension and connected to the bed means for angular motion with respect thereto and to the first element for angular motion with respect thereto, and reciprocating means for imparting motion to the link elements in a direction transverse to said one dimension thereby cyclically increasing and decreasing the length of the jointed link means.

11. Image reproducing apparatus according to claim 10 wherein the reciprocating means comprises lever means, cam means for driving the lever means cyclically, and support means for the lever means providing at least two alternative pivot points therefor so as to permit changes in the magnitude of the motion imparted to the link elements.

12. Image reproducing apparatus according to claim 11 wherein the lever means is formed with at least two parallel bores extending perpendicularly to its plane of motion and the support means comprises at least two parallel rods each having a full diameter portion fitting closely into one of the bores and a reduced diameter portion longitudinally displaced from the full diameter portion and means for supporting the two rods for sliding motion in the bores so that when the full diameter portion of one of the rods is located within one bore, the reduced diameter portion of the other rod is located within the other bore.

13. Image reproducing apparatus according to claim 9 including means for supporting the carriage means for sliding motion on the bed means including at least one cylindrical member adjustably mounted on one of the carriage means and the bed means having its axis extending in said one dimension, and shoe means having a complementary bearing surface carried by the other of the bed means and the carirage means adapted to slide on the surface of the cylindrical member.

14. Image reproducing means according to claim 13 wherein the bearing surface comprises a layer of antifriction material affixed to the shoe means by a layer of cement means.

15. Image reproducing apparatus according to claim 9 wherein the bar means is affixed to one side of the carriage means and includes means disposed on both sides of the carriage means for supporting the carriage means for sliding motion on the bed means, and rolling means resiliently supporting the carriage means on the bed means on the side opposite to the bar means to reduce the friction engagement of the carriage means with the support means so as to place the center of resistance to longitudinal motion of the carriage means in the vicinity of the bar means.

16. Image reproducing apparatus according to claim 9 wherein the clutch means comprises clamping plate means supported adjacent to the bar means to engage the bar means, lever means supported for pivotal motion having a portion movable toward and away from the plate means, and roller means interposed between the portion of the lever means and the plate means to transmit bar engaging motion to the plate means upon pivoting motion of the lever means.

17. Image reproducing apparatus according to claim 16 including second roller means supporting the lever means for pivotal motion.

18. Image reproducing apparatus according to claim 17 wherein the bar means comprises a channel member having two opposed side walls and the clutch means is disposed within the channel member so that the plate means engages one side wall thereof and including second plate means disposed between the second roller means and the other side wall of the channel member to engage that side wall upon pivoting motion of the lever means.

19. In apparatus including two members supported for relative linear motion, drive means for imparting a precise step-by-step linear relative motion to the members comprising clutch means for engaging one of the members intermittently, and reciprocating jointed link means comprising two bar members disposed substantially in line between the clutch means and the other member, a connecting link between the two bar members permitting relative angular motion therebetween so as to vary the effective combined length of the two bar members and means for transversely reciprocating the connecting link between the bar members in conjunction with the operation of the clutch means to impart said linear relative motion to the members.

20. In apparatus including two members supported for relative linear motion, drive means for imparting a precise step-by-step linear relative motion to the members comprising bar means rigidly attached to one of the members and extending parallel to the direction of the linear motion, clutch means including plate means movable toward the bar means for engagement therewith, reciprocating lever means in the clutch means having one portion movable toward the plate means, roller means in the clutch means and interposed between the lever means and the plate means to clamp the plate means against the bar means upon operation of the lever means, and reciprocating drive means interposed between the clutch means and the other member, operable in timed relation to the lever means to transmit reciprocating motion to the clutch means with respect to the other member.

21. In apparatus including a carriage member supported for linear sliding motion on a bed member, support means including a cylindrical body adjustably affixed to one of the members with its axis parallel to the direction of relative linear motion and including a planar bearing surface, and shoe means carried by the other member having a complementary partial cylindrical bearing surface adapted to slide on the surface of the cylindrical body and a complementary planar bearing surface adapted to slide on the planar bearing surface of the support means.

22. Image reproducing apparatus comprising a first image medium support member for supporting an image-bearing medium for angular motion about a first axis, a second image medium support member for supporting an image receiving medium for angular motion about a second axis, means for detecting an image on the image bearing medium supported for linear motion relative to the first support member, means for producing an image on the image receiving medium supported for linear motion relative to the second support member, drive means for imparting angular motion to the support members in unison, spline means for transmitting angular motion to one of the support members while permitting linear motion thereof with respect to the drive means and flexible joint means in the spline means including an element which is rigid in the direction of angular motion and in the axial direction thereof but resilient in a direction transverse thereto.

23. Image reproducing apparatus according to claim 22 wherein the flexible joint means comprises a disk-like member attached at selected angular locations to one portion of the spline means and attached at intermediate angular locations to another portion of the spline means.

24. Image reproducing apparatus according to claim 23 wherein the disk-like member is annular in shape and including captive ball joint means disposed centrally in the annular member and connecting the two spline means portions.

25. Image reproducing means according to claim 22 wherein the spline means comprises tubular means having a plurality of longitudinally extending guides on the inner surface thereof and connected to one of the drive means and the support member, and a centrally disposed member having a corresponding plurality of guide engaging elements positioned to engage the guides and prevent relative angular motion of the centrally disposed member and the tubular member while permitting relative longitudinal motion therebetween.

26. Image reproducing apparatus comprising a first image medium support member for supporting an image-bearing medium, means for detecting an image on the image-bearing medium supported for linear motion relative to the first support member, a second image medium support member for supporting a light sensitive image receiving medium, light source means for producing an image on the image receiving medium supported for linear motion relative to the second support member, light-tight housing means enclosing the second support member in fixed position relative thereto and having a longitudinally extending opening adjacent to the light source means, spring-biased roller means at each end of the opening, and baffle means disposed adjacent to the opening including curtain means wound onto the roller means and connected to the light source means to prevent extraneous light from entering the housing through the opening upon relative motion of the light source means and the member.

27. Image reproducing apparatus according to claim 26 including aperture means forming an aperture disposed between the light source means and the second support member, and means for varying the size of the aperture formed by the light source means in two directions independently.

28. Image reproducing apparatus comprising an image medium support member for supporting a light sensitive image receiving medium, light source means for generating an image point by point on the medium, means for providing relative motion between the support member and the light source means in two directions, aperture means forming an aperture between the support member and the light source means, and means for controlling the dimensions of the aperture in two directions independently including toggle spring means for releasably retaining the aperture forming means in either of two positions providing different aperture dimensions, respectively.

29. Image reproducing apparatus according to claim 28 wherein the aperture means comprises a first opaque member extending transversely to the path of light between the light source means and the support member and having an edge forming one boundary portion of the aperture, a second opaque member adjacent to the first opaque member having an edge forming another boundary portion of the aperture and supported for motion toward and away from the center of the aperture in one direction, and a third opaque member adjacent to the first and second opaque members having an edge forming a third boundary portion of the aperture and supported for motion toward and away from the center of the aperture in another direction.

30. Image reproducing apparatus according to claim 29 including resilient means for urging one of the movable opaque members and adjustable stop means opposing the action of the resilient means to permit adjustment of that movable opaque member within a range of positions.

31. In optical apparatus including light source means and means for forming an image of an aperture illuminated by the light source means, means forming an aperture which is adjustable in size in two directions independently comprising a first opaque member extending transversely to the path of light from the source means and having an edge forming one boundary portion of the aperture, a second opaque member adjacent to the first opaque member having an edge forming another boundary portion of the aperture and supported for motion toward and away from the center of the aperture in one direction, a third opaque member adjacent to the first and second opaque members having an edge forming a third boundary portion of the aperture and supported for motion toward and away from the center of the aperture in another direction, and toggle spring means for releasably retaining one of the opaque members in either of two positions providing different aperture dimensions, respectively.

32. Apparatus according to claim 31 including resilient means for urging one of the opaque members and adjustable stop means opposing the action of the resilient means to permit adjustment of that movable opaque member within a range of positions.

33. Image reproducing apparatus comprising an image medium support member for supporting a plurality of light sensitive image-receiving elements, a corresponding plurality of light source means for producing images on the image-receiving elements simultaneously, light aperture plate means interposed between each light source means and the corresponding image receiving element, register mark means located on the imaged receiving element side of each aperture plate means, and means for illuminating all of the register mark means simultaneously to expose corresponding register marks on the image receiving elements.

34. In apparatus including two members supported for relative linear motion, drive means for imparting a precise step-by-step linear relative motion to the members comprising clutch means for engaging one of the members intermittently, reciprocating means extending between the clutch means and the other member operable in conjunction with the operation of the clutch means to impart said linear relative motion to the members, means for actuating the clutch means, and a mechanical disconnect member interposed between the actuating means and the clutch means and movable between a first position prevent operation of the clutch means by the actuating means and a second position permitting operation of the clutch means by the actuating means.

References Cited by the Examiner

UNITED STATES PATENTS

| 2,214,293 | 9/1940 | D'Aubarede | 180—73 |
| 2,744,950 | 5/1956 | Hall | 178—5.4 |
| 2,755,707 | 7/1956 | Meltzer | 88—14 |
| 2,778,232 | 1/1957 | Mork | 74—125.5 |
| 2,950,149 | 8/1960 | Thomson | 308—4 |
| 2,964,998 | 12/1960 | Middlestadt | 88—61 |
| 3,130,631 | 4/1964 | Murata | 88—24 |

DAVID G. REDINBAUGH, *Primary Examiner.*

H. W. BRITTON, *Assistant Examiner.*